United States Patent
Kruckemyer et al.

(10) Patent No.: US 9,280,479 B1
(45) Date of Patent: *Mar. 8, 2016

(54) MULTI-LEVEL STORE MERGING IN A CACHE AND MEMORY HIERARCHY

(75) Inventors: David A. Kruckemyer, San Jose, CA (US); John Gregory Favor, Scotts Valley, CA (US); Matthew W. Ashcraft, Belmont, CA (US)

(73) Assignee: Applied Micro Circuits Corporation, Santa Clara, CA (US)

( * ) Notice: Subject to any disclaimer, the term of this patent is extended or adjusted under 35 U.S.C. 154(b) by 91 days.

This patent is subject to a terminal disclaimer.

(21) Appl. No.: 13/478,100

(22) Filed: May 22, 2012

(51) Int. Cl.
*G06F 12/08* (2006.01)

(52) U.S. Cl.
CPC ........ *G06F 12/0871* (2013.01); *G06F 12/0868* (2013.01)

(58) Field of Classification Search
USPC ........... 711/118, 119, 122, 135, 144, E12.017
See application file for complete search history.

(56) References Cited

U.S. PATENT DOCUMENTS

| | | | | |
|---|---|---|---|---|
| 5,282,177 A * | 1/1994 | McLaury | ................. | 365/230.05 |
| 5,539,895 A * | 7/1996 | Bishop et al. | ................. | 711/138 |
| 5,561,780 A * | 10/1996 | Glew et al. | ..................... | 711/126 |
| 6,122,715 A * | 9/2000 | Palanca et al. | ................. | 711/154 |
| 6,356,270 B2 * | 3/2002 | Pentkovski et al. | ........... | 345/530 |
| 6,434,639 B1 * | 8/2002 | Haghighi | ........................ | 710/39 |
| 6,560,669 B1 * | 5/2003 | Ryan | ............................. | 711/105 |
| 8,352,685 B2 * | 1/2013 | Bannon et al. | ................. | 711/135 |
| 2012/0117323 A1 * | 5/2012 | Cypher et al. | ................. | 711/118 |
| 2013/0191651 A1 * | 7/2013 | Muff et al. | ..................... | 713/193 |

OTHER PUBLICATIONS

Prvulovic et al., "The Split Spatial/Non-Spatial Cache: A Performance and Complexity Evaluation", in Newsletter of Technical Committee on Computer Architecture, IEEE Computer Society, Jul. 1999.*

Jiang et al. "DULO: An Effective Buffer Cache Management Scheme to Exploit Both Temporal and Spatial Locality" (FAST '05: 4th USENIX Conference on File and Storage Technologies, 2005.*

Prvulovic et al. ("The Split Spatial/Non-Spatial Cache: A Performance and Complexity Evaluation", in Newsletter of Technical Committee on Computer Architecture, IEEE Computer Society, Jul. 1999).*

(Continued)

*Primary Examiner* — Ryan Bertram
*Assistant Examiner* — Tracy Chan
(74) *Attorney, Agent, or Firm* — Amin, Turocy & Watson, LLP

(57) ABSTRACT

A memory system having increased throughput is disclosed. Specifically, the memory system includes a first level write combining queue that reduces the number of data transfers between a level one cache and a level two cache. In addition, a second level write merging buffer can further reduce the number of data transfers within the memory system. The first level write combining queue receives data from the level one cache. The second level write merging buffer receives data from the first level write combining queue. The level two cache receives data from both the first level write combining queue and the second level write merging buffer. Specifically, the first level write combining queue combines multiple store transactions from the load store units to associated addresses. In addition, the second level write merging buffer merges data from the first level write combining queue.

24 Claims, 17 Drawing Sheets

(56) References Cited

OTHER PUBLICATIONS

Jiang et al. "DULO: An Effective Buffer Cache Management Scheme to Exploit Both Temporal and Spatial Locality" (FAST '05: 4th USENIX Conference on File and Storage Technologies).*

Yadgar et al. (Karma: Know-It-All Replacement for a Multilevel cAche, FAST '07: 5th USENIX Conference on File and Storage Technologies).*

Naz et al. ("Improving data cache performance with integrated use of split caches, victim cache and stream buffers", ACM SIGARCH: MEDEA 2004 workshop, vol. 33 Issue 3, Jun. 2005, pp. 41-48.*

* cited by examiner

MULTI-LEVEL STORE MERGING IN A CACHE AND MEMORY HIERARCHY

BACKGROUND

1. Background Field

The present invention relates to memory systems and in particular to cache and memory hierarchy.

2. Relevant Background

Processors, such as microprocessors, digital signal processors, and microcontrollers, are generally divided into many systems and sub-systems, such as a memory system, a processing unit, and load store units. The load store unit transfers data between the processing units and the memory system. Specifically, the load store unit reads (i.e. loads) data from the memory system and writes (i.e. stores) data to the memory system. To improve performance, memory systems generally have a memory hierarchy using one or more level of caching.

FIG. 1 shows a simplified block diagram of a load store unit 110 coupled to a memory system 140. Load store unit 110 includes an instruction decoder 111, a load scheduler 113, a load pipeline 115, a store scheduler 117, and a store pipeline 119. Memory system 140 includes a level one cache 142, a level two cache 143, and a level three memory sub-system 144. In various embodiments of memory system 140, level three memory sub-system 144 may include additional cache levels in addition to the main memory. In some processors, instruction decoder 111 may be part of another subsystem. Instruction decoder 111 decodes the program instructions and sends load transactions to load scheduler 113 and store transactions to store scheduler 117. Other types of instructions are sent to appropriate execution units, such as a floating point execution unit, or an integer execution unit. In most systems with multiple processing units, each processing unit includes a separate load/store unit. Store scheduler 117 schedules the store transactions and issue store transactions to store pipeline 119. Store pipeline 119 executes the store transactions, which typically stores data into memory system 140. Load scheduler 113 schedules the load transactions and issue load transactions to load pipeline 115 for execution. Load pipeline 115 executes the load transactions and reads the requested data from memory system 140.

Generally, load store unit 110 communicates directly with level one cache 142 and memory system 140 controls the data flow between level one cache 142, level two cache 143 and level three memory sub-system 144. Level one cache 142 and level two cache 143 are used to improve overall memory throughput of memory system 140. For example, level three memory sub system 144 would generally include a large memory unit that is typically made with high density memory devices that have slow access times. Level one cache 142 and level two cache 143 are made with faster memory devices that require larger area or are of greater cost than the high density memory devices used in level three memory sub-system 144.

When, load store unit 110 requests data at a location that is stored or "cached" in level one cache 142, i.e. a level one cache hit, or in level two cache 143, i.e. a level two cache hit, the data can be supplied to load store unit 110 very rapidly because access to high density memory devices is not required. Data in level one cache 142 would be available even faster than data in level two cache 143. In most embodiments of memory system 140, when load store unit 110 writes data to a memory location memory system 140, data can be written directly to level one cache 142 whether or not the memory location is currently cached in level one cache 142. Specifically, if the memory location is cached than the data is simply stored in the appropriate cache location. If the memory location is not cached, space in level one cache will be allocated for the memory location. Once data is written into level one cache 142, memory system 140 will eventually transfer the data to level two cache 143 and level three memory sub-system 144.

Generally, level one cache 142 has a first cache width (i.e. the size of a cache line) and level two cache 143 has a second cache width that is larger the first cache width of level one cache 142. The transfer of data from level one cache 142 to level two cache 143 and level three memory sub-system 144 greatly burdens the throughput of memory system 140. Hence there is a need for a method and system to improve the transfer of data between memory levels in a multi-level memory system.

SUMMARY

Accordingly, the present invention provides a first level write combining queue that reduces the number of data transfers between a level one cache and a level two cache. In addition some embodiments of the present invention also include a second level write merging buffer that can further reduce the number of data transfers within a memory system. Embodiments of the present invention can be used with systems having multiple processing units as well as single core processors. Specifically, in one embodiment of the present invention the memory system, a memory system for receiving data from a load store unit includes a first level data cache, a first level write combining queue, a second level write merging buffer and a second level data cache. The level one cache is coupled to receive data from the load store unit. The first level write combining queue coupled to receive data from the level one cache. The second level write merging buffer is coupled to receive data from the first level write combining queue. The level two cache is coupled to receive data from both the first level write combining queue and the second level write merging buffer. Specifically, the first level write combining queue is configured to combine multiple store transactions from the load store units to associated addresses. In addition, the second level write merging buffer is configured to merge data from the first level write combining queue.

In addition in some embodiments of the present invention the destination of the data in the second level write merging buffer is determined dynamically based on the status of the data and the transaction type of the write command. For example, when a data buffer line is "perfected", i.e. every data line data byte in the data buffer line contains valid data, and the write command was a block write command, then the data in the data line buffer is stored in a level four memory sub-system. When the data buffer line is perfected and the write command was not a block write command then the data is stored in a level three cache. However, if the data in a data buffer line is to be written out before the data buffer line is perfected, the data is stored in the level two cache.

The present invention will be more fully understood in view of the following description and drawings.

DETAILED DESCRIPTION

Figure 2:
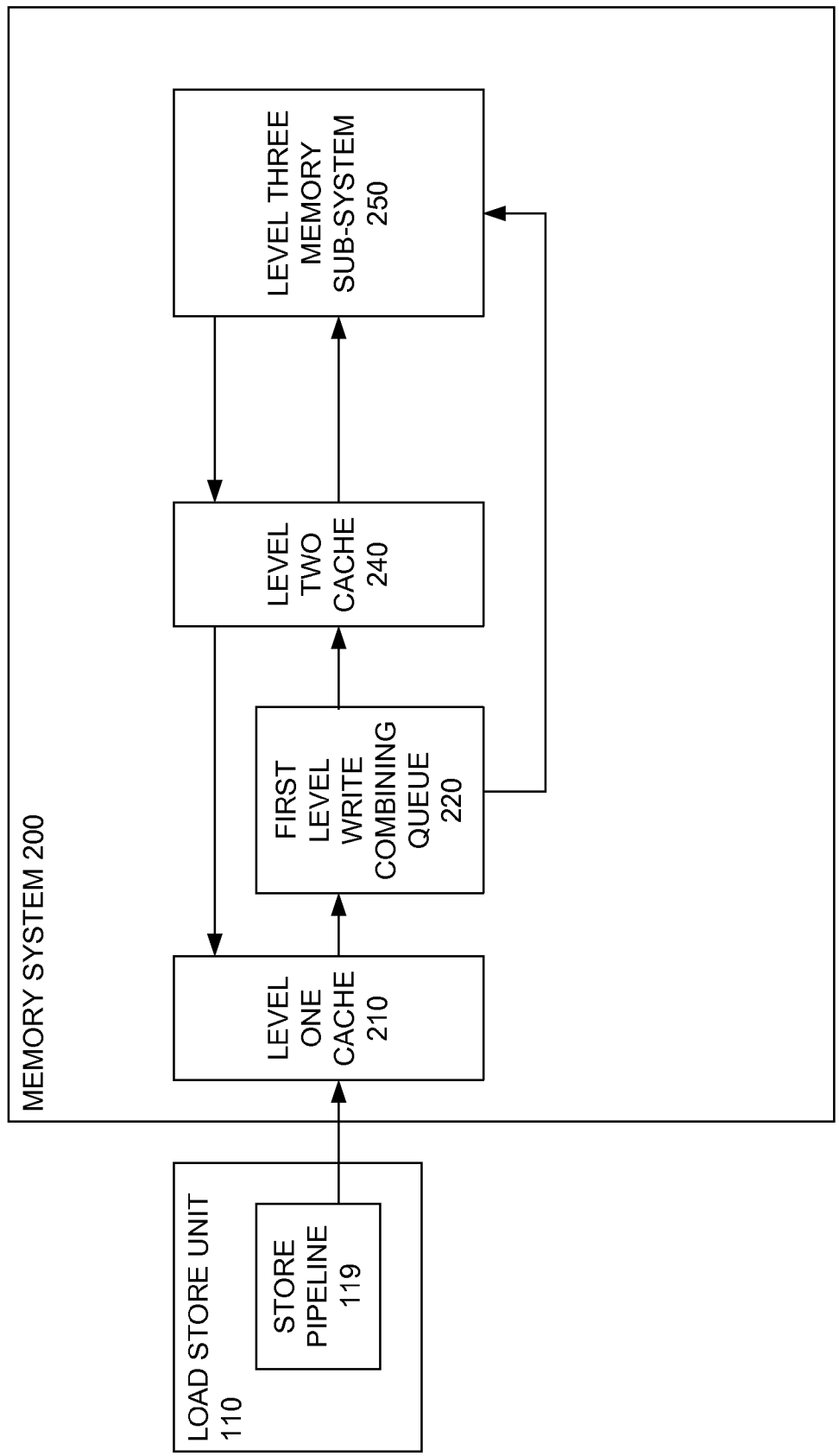
FIG. 2 is a simplified block diagram of a load store unit with a memory system in accordance with one embodiment of the present invention.

As explained above, data transfers between various memory levels of multi-level memory systems reduce the bandwidth and throughput of the memory system. However, in accordance with embodiments of the present invention, memory systems include write combining queues and write merging buffers to reduce the number of data transfers between various memory levels in the memory system. FIG. 2 shows a simplified block diagram of memory system 200 in accordance with one embodiment of the present invention coupled to a load store unit 110. Due to space limitation only store pipeline 119 is shown in FIG. 2. Memory system 200 includes a level one cache 210, a first level write combining queue 220, a level two cache 240, and a level three memory sub-system 250. Level one cache 210 receives data from load store unit 110. First level write combining queue 220 is coupled between level one cache 210 and level two cache 240 and is used to reduce the number of data transfers between level one cache 210 and level two cache 240 as explained below. Furthermore, in some embodiments of the present invention, first level write combining queue 220 is also coupled to level three memory sub-system 250. Level three memory sub-system 250 is also coupled to level two cache 240.

Figure 1:
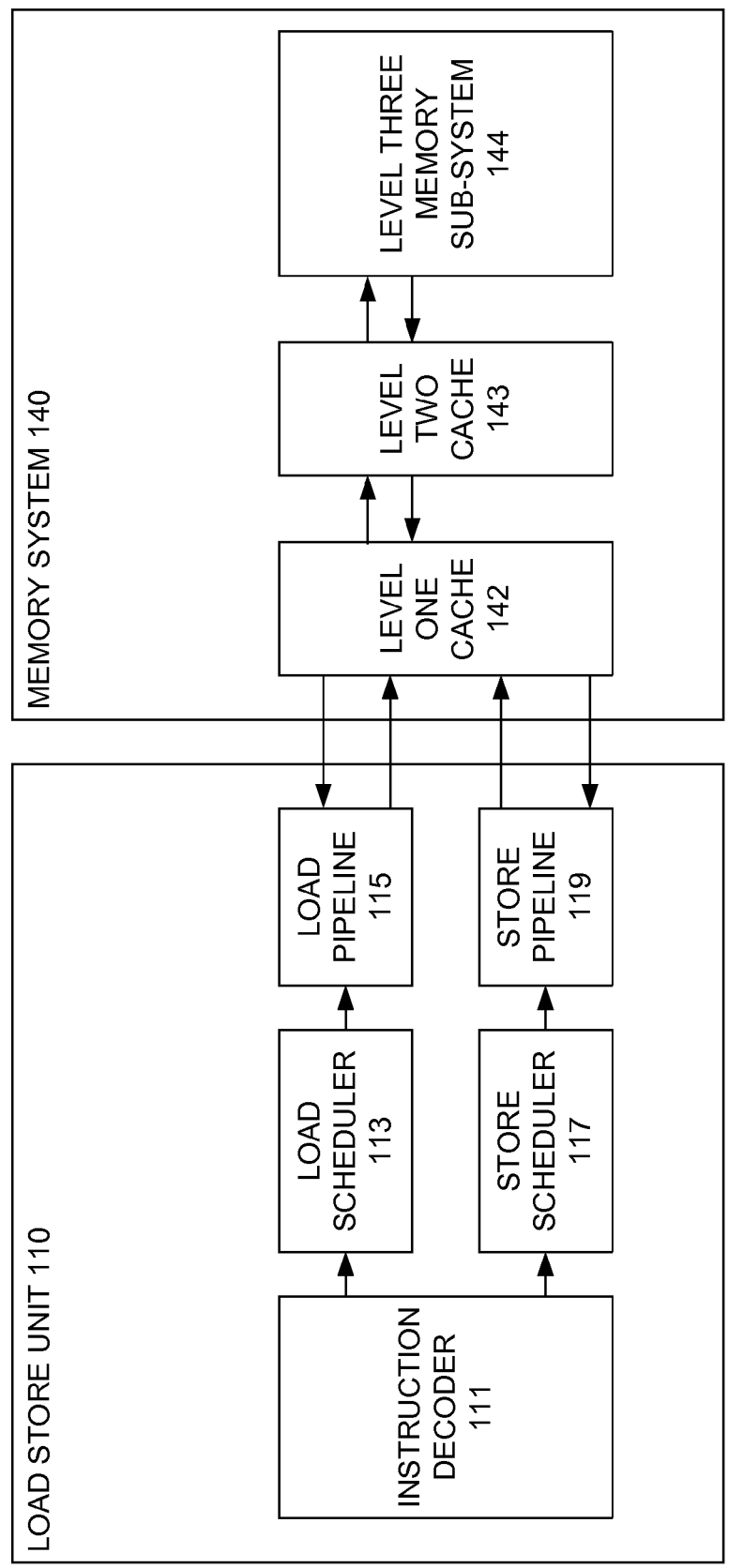
FIG. 1 is a simplified block diagram of a load store unit and a memory system.

Level one cache 210 has a first cache width CW1 and level two cache 240 has a second cache width CW2, which is greater than or equal to first cache width CW1. Furthermore, load store unit 110 generally operates using a store data width SDW that is smaller than first cache width CW1 and second cache width CW2. For example, in one embodiment of the present invention, store data width SDW is 8 bytes, first cache width CW1 is 16 bytes and second cache width CW2 is 64 bytes. As explained above, generally after data is written into level one cache 210, the data will at some later point be transferred to level two cache 240, and to level three memory sub-system 250. For example, "write through caches" would write data coming into level one cache 210 to level two cache 240 as soon as possible. However, because store data width SDW of load store unit 110 is smaller than first cache width CW1 and second cache width CW2, there may be many situations when data from multiple store instructions from load store unit 110 would be in the same cache line of level two cache 240. In conventional memory systems, such as memory system 140, every store instruction that puts data into level one cache 142 would cause a data transfer from level one cache 142 to level two cache 143 (FIG. 1). However, in memory system 200, the data stored in level one cache 210 from multiple store instructions can be combined using first level write combining queue 220. The combined data is then transferred to level two cache 240 or level three memory sub-system 250 using one data transfer. Generally, data from store instructions to associated addresses can be combined. Generally, memory addresses are associated if the addresses can be mapped into a single cache line of level one cache 210. A detailed embodiment of first level write combining queue 220 is described below and illustrated in FIG. 4.

Figure 3:
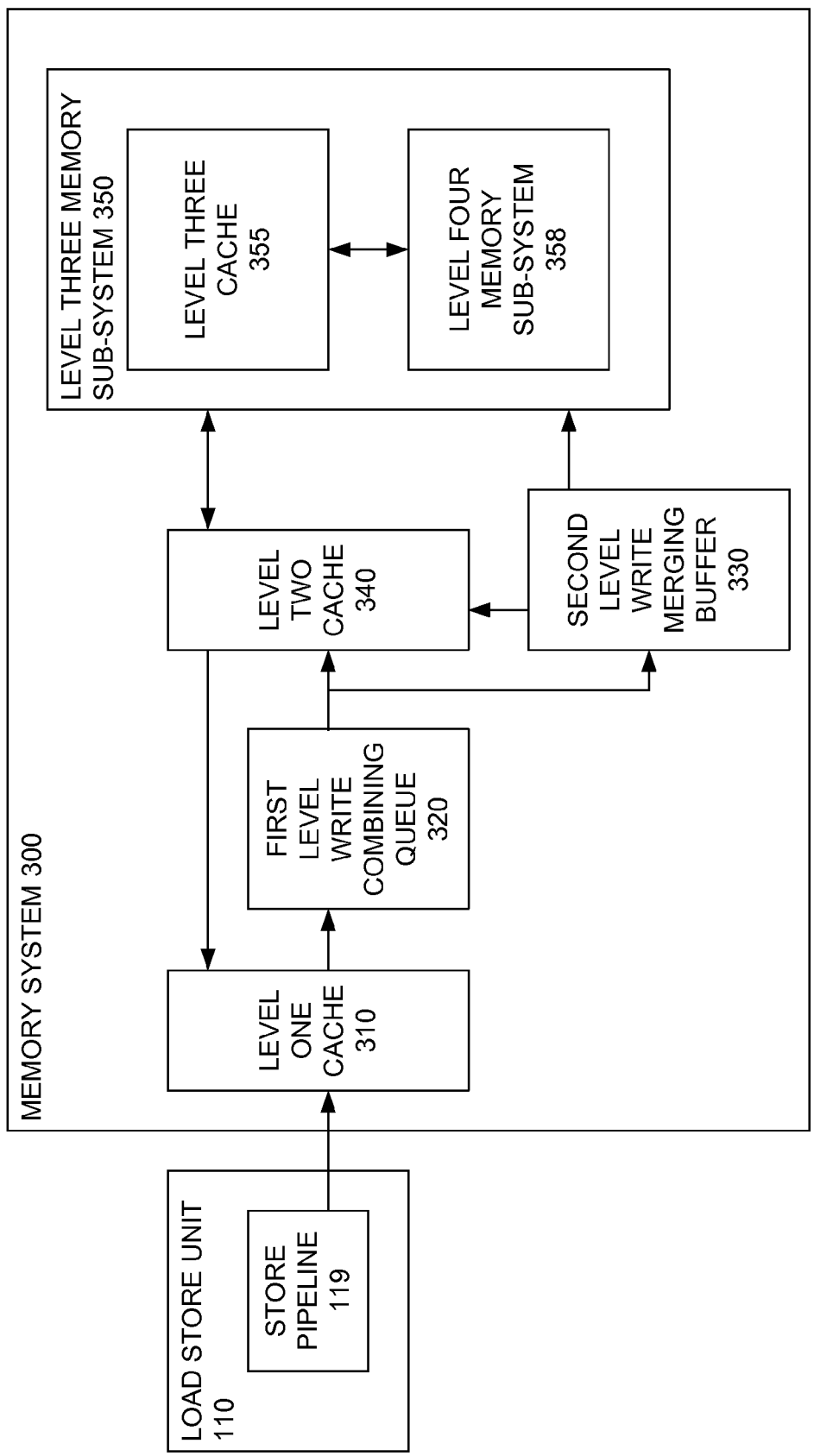
FIG. 3 is a simplified diagram of a load store unit with a memory system in accordance with another embodiment of the present invention.

In embodiments of the present invention in which cache width CW1 of level one cache 210 is smaller that cache width CW2 of level two cache 240, there may be many situations when different cache lines in level one cache 210 would map to a single cache line in level two cache 240. Therefore, some embodiments of the present invention also include a second level write merging buffer as illustrated in FIG. 3. Specifically, FIG. 3 shows a simplified block diagram of memory system 300 in accordance with one embodiment of the present invention coupled to a load store unit 110. Memory system 300 includes a level one cache 310, a first level write combining queue 320, a second level write merging buffer 330, a level two cache 340, and a level 3 memory sub-system 350, which includes a level three cache 355 and a level four memory sub-system 358. In memory system 300, first level write combining queue 320 and second level write merging buffer 330 are used together to greatly reduce the number of memory transfers in memory system 300. As in memory system 200, first level write combining queue 320 is coupled between level one cache 310 and level two cache 340. However, in memory system 300, first level write combining queue 320 is also coupled to write data into second level write merging buffer 330 under conditions described below. Second level write merging buffer 330 combines data from first level write combining queue 320 and writes the combined data into level two cache 340, level three cache 355, or level four memory sub-system 358. Generally, a data value DV_1 for an address value AV_1 written out from first write level write combining queue 320 are stored in level two cache 340 if address value AV_1 is cached in level two cache 340 (i.e. a level two cache hit). However, if address value AV_1 is not cached in level two cache 340 (i.e. a level two cache miss), data value DV_1 is stored in second level write merging buffer 330. If additional data fields are written out from first level write combining queue having addresses associated with addresses of data values already in second level write merging buffer 330 the data values can be combined. The combined data values are later written from second level write merging buffer 330 to level two cache 340, level three cache 355 or level four memory sub-system 358 as described in detail below. A specific embodiment of second level write merging buffer 330 is describe below and illustrated in FIG. 6.

Figure 4:
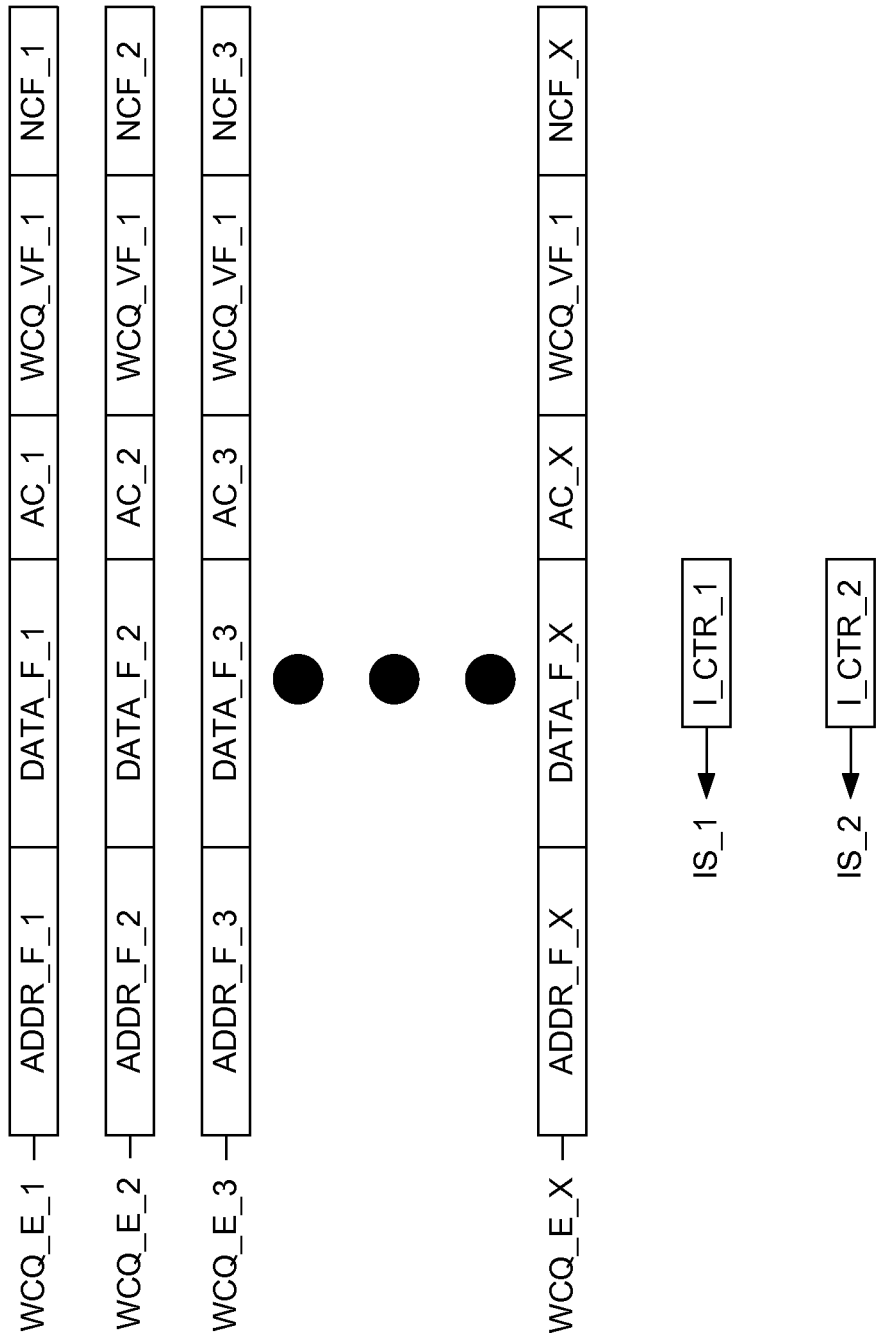
FIG. 4 is a block diagram of a first level write combining queue in accordance with one embodiment of the present invention.

FIG. 4 is a block diagram of a first level write combining queue 400 in accordance with one embodiment of the present invention. First level write combining queue 400 includes multiple write combining queue entries (hereinafter WCQ entries, a first increment counter I_CTR_1 and a second increment counter ICTR_2. Specifically, write combining queue 400 includes X WCQ entries WCQ_E_1 to WCE_E_X. WCQ entry WCQ_1 includes an address field ADDR_F_1, a data field DATA_F_1, an age counter AC_1, a write combining queue valid flag WCQ_VF_1 (herein after WCQ valid flag), and a non-combinable flag NCF_1. Similarly, each WCQ entry WCE_E_Y includes an address field ADDR_F_Y, a data field DATA_F_Y, an age counter AC_Y, a WCQ valid flag WCQ_VF_Y, and a non-combinable flag NCF_Y. Address field ADDR_F_Y is used to store the address of the data stored in WCQ entry WCQ_E_Y. Data field DATA_F_Y is used to store data value from the store transactions. Data field DATA_F_Y includes multiple data byte fields. A particular store instruction may have data for only a subset of the data byte fields of data field DATA_F_Y. WCQ valid flag WCQ_VF_Y is used to indicate which data byte fields in data field DATA_F_Y contain valid data. Thus for example, in an embodiment of a write combining queue in accordance with the present invention, data field DATA_F_1 has 16 bytes (i.e. 16 data byte fields) and WCQ valid flag WCQ_VF_Y has 16 bits, with each bit corresponding to one byte of data field DATA_F_1. For clarity, the Z data byte fields of a data field DATA_F_Y is referenced as data byte fields DATA_F_Y_1, DATA_F_Y_2, . . . DATA_F_Y_Z. Similarly, the Z WCQ valid flag bits of WCQ valid flag WCQ_VF_Y is referenced as WCQ valid flag WCQ_VF_Y_1, WCQ_VF_Y_2, . . . WCQ_VF_Y_Z. When data is written into a data field byte DATA_F_Y_Z, the corresponding WCQ valid flag bit WCQ_VF_Y_Z is set to a valid state (typically logic 1). When the data in a WCQ entry WCQ_E_Y is transferred out of first level write combining queue 400, the WCQ valid flag bits of WCQ valid flag WCQ_VF_Y are all set to an invalid state (typically logic 0).

Age counter AC_Y is used to indicate the age of the data in WCQ entry WCQ_E_Y and is used to determine when the data in a WCQ entry WCQ_E_Y is transferred out of first level write combining queue 400 as explained below. Non-combinable flag NCF_Y indicates whether additional data can be combined with the data in data field DATA_F_Y. Generally, certain special operations, such as cache management operations, can not be combined. When these special operations are stored in a WCQ entry WCQ_E_Y, non-combinable flag NCF_Y is set to a valid state (typically logic 1). When non-combinable flag NCF_Y is in the valid state, later store transactions are not combined with into WCQ entry WCQ_E_Y. The non-combinable flag is also used in determining when a WCQ entry is written out of first level write combining queue 400 as described below.

When a store transaction arrives in write combining queue 400, the address in the store transaction is compared to the addresses in the valid combinable WCQ entries containing valid data (i.e. WCQ entries in which at least one WCQ valid flag bit is in the valid state and the non-combinable flag is in the invalid state). If the address in the store transaction is associated with an address in a valid combinable WCQ entry the data from the store transaction is combined into the data field of the valid combining WCQ entry. If none of the addresses in valid combinable WCQ entries are associated with the address in the store transaction, the data and address in the store transaction are stored in an empty WCQ entry if one is available. If none of the WCQ entries are empty, the store transaction would stall.

The longer a WCQ entry remains in the first level write combining queue the more opportunities for write combining occurs. However, the WCQ entries can not remain in the first level write combining queue indefinitely. Therefore, first level write combining queue 400 includes a mechanism to insure that WCQ entries are written out within a reasonable time period.

Specifically, first increment counter I_CTR_1 produces a first increment signal IS_1 that has an increment transition once every increment period INC_PER_1. Second increment counter I_CTR_2 produces a second increment signal IS_2 that has also has an increment transition once every increment period INC_PER_2. In one embodiment of the present invention, increment period INC_PER_1 and increment period INC_PER_2 are both 16 clock cycles. However increment signal IS_1 and IS_2 are offset so that the increment transitions of increment signal IS_2 are located in between the increment transitions of increment signal IS_1. Increment transitions on increment signal IS_1 causes the age counters of all valid WCQ entries to increment. Furthermore, increment transitions on increment signal IS_2 causes the age counter of the valid WCQ entry with the largest age counter value to increment (i.e. the oldest valid WCQ entry). When age counter AC_Y of a valid combinable WCQ entry WCQ_E_Y reaches a WCQ age threshold WCQ_T_AGE, non-combinable flag NCF_Y of WCQ entry WCQ_E_Y is set to the valid state. When the oldest valid WCQ entry (i.e. the WCQ entry with the largest age counter) has a valid non-combinable flag, the oldest valid WCQ entry is written out of the first level write combining queue as soon as possible. Thus, the non-combinable flag can also be considered to be a ready to issue flag.

Figure 5A:
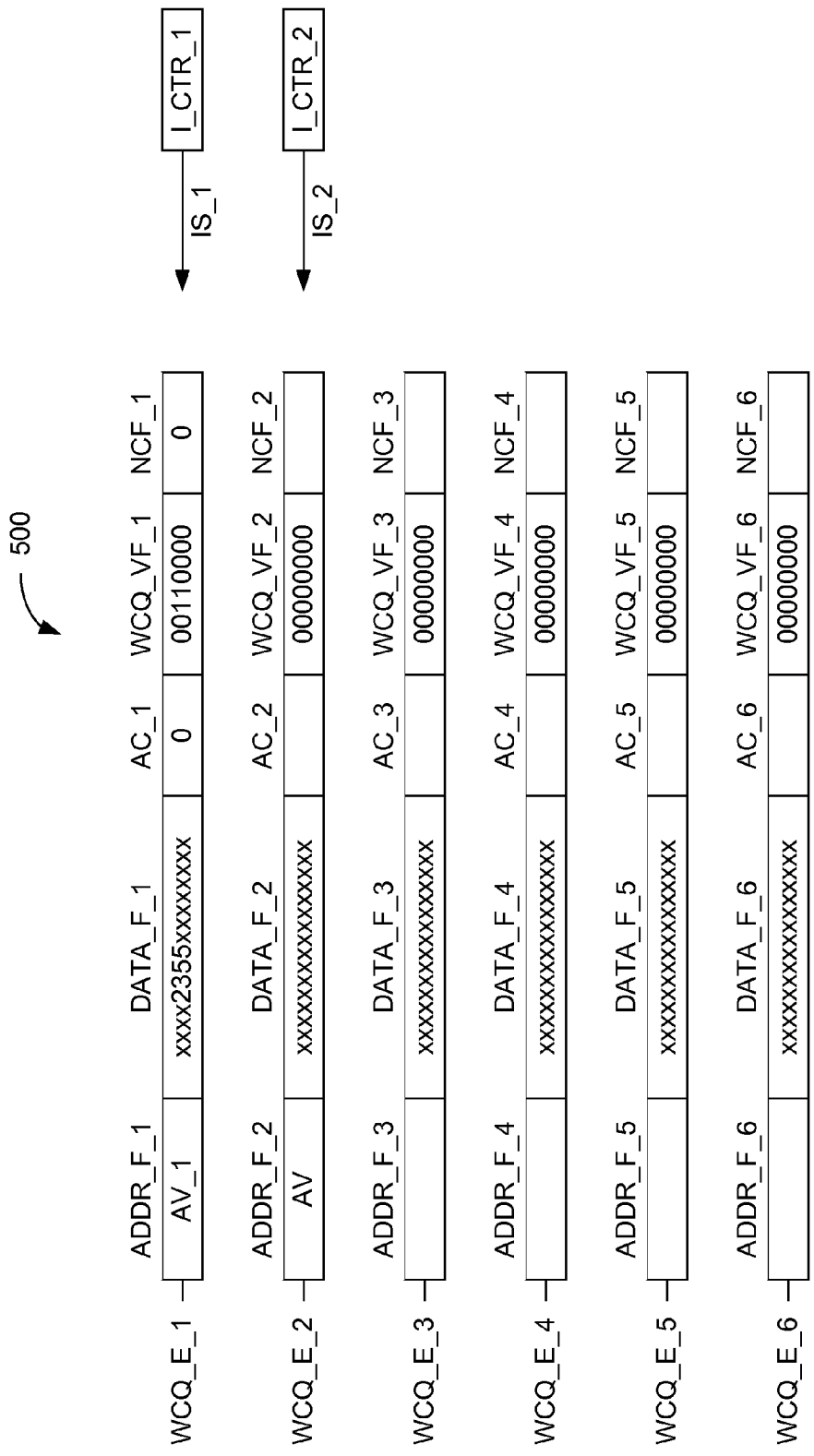
FIGS. 5A-5I are simplified diagrams illustrating the use of a first level write combining queue in accordance with one embodiment of the present invention.
Figure 5B:
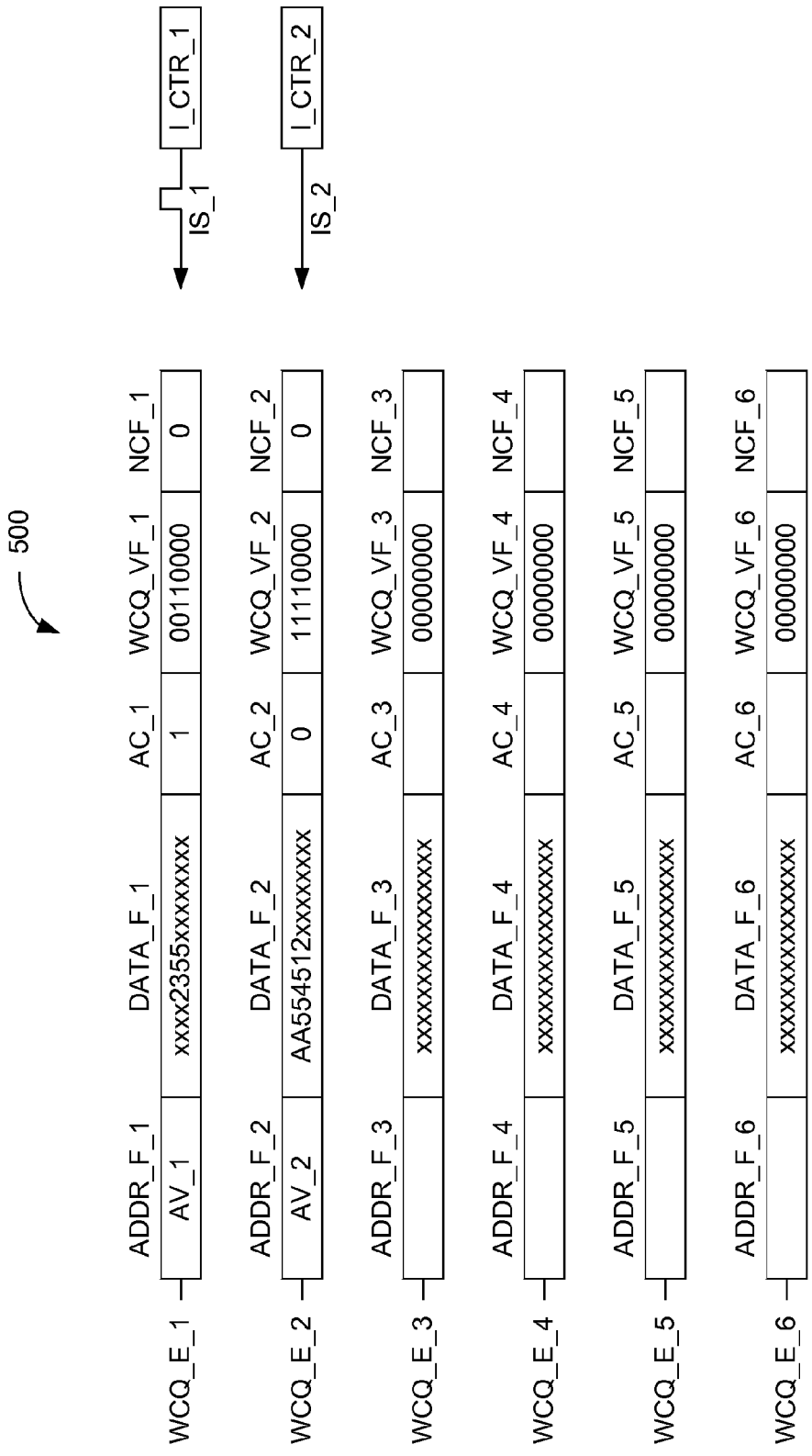
Figure 5C:
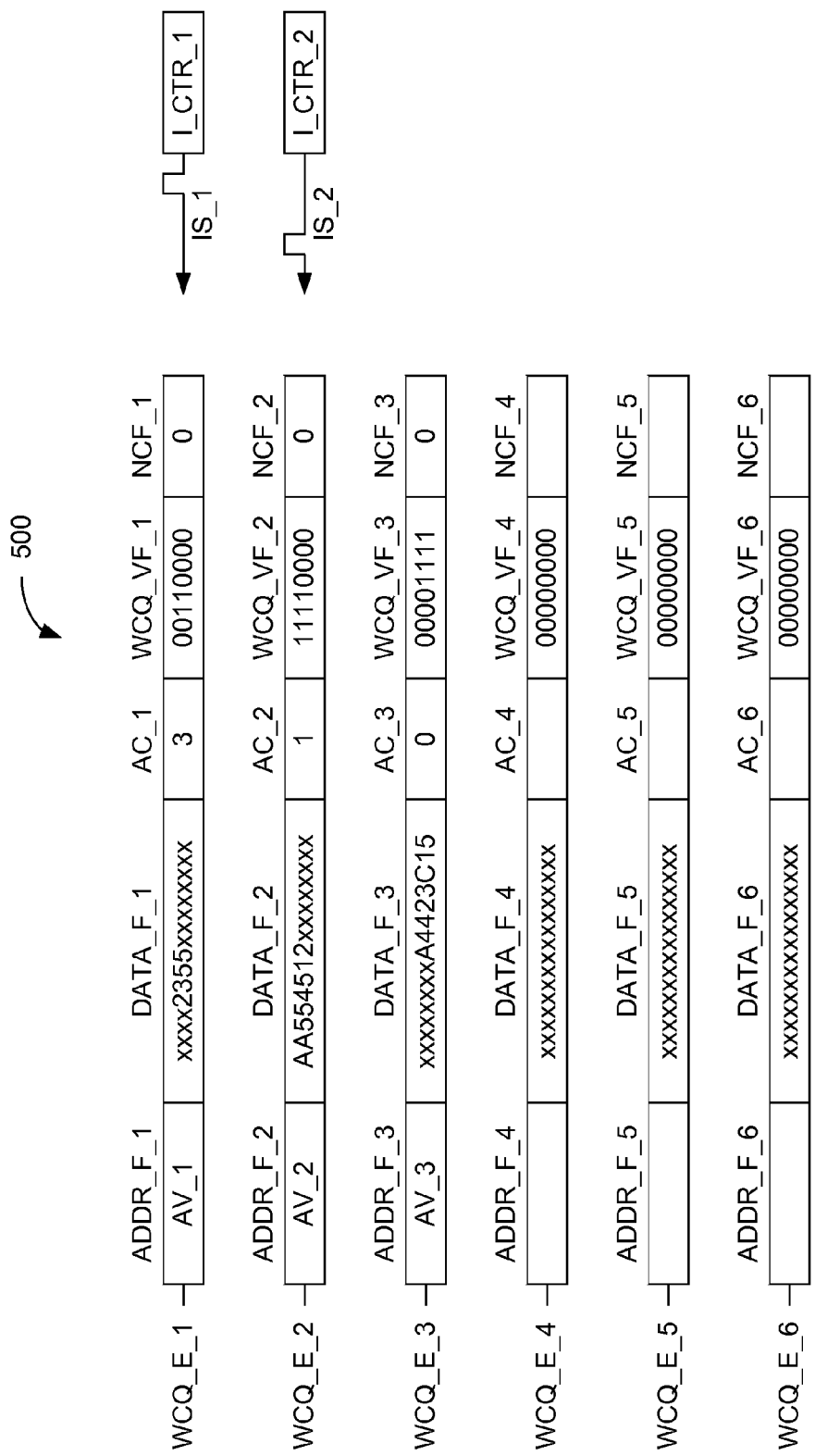

FIGS. 5A-5I illustrate the operation of a first level write combining queue 500 in accordance with one embodiment of the present invention using the seven store transactions shown in Table 1. First level write combining queue 500 includes 6 WCQ entries, each of which has a data field with 8 data byte fields. However other embodiments of the present invention, may have data fields with more or less data byte fields. For example, one embodiment of the present invention includes data fields with 16 data byte fields. FIGS. 5A-5I also show increment signals IS_1 and IS_2. The time interval shown on increment signal IS_1 and IS_2 in each of FIGS. 5A-5I represents the time between the previous figure and the current figure. For example, in FIG. 5B, increment signal IS_1 shows an increment transition occurred between the time if FIG. 5A and the time of FIG. 5B. In FIG. 5C, increment transitions are shown on both signal IS_2 and increment signal IS_1. The increment transition on increment signal IS_2 is placed to the left of the increment transition on increment signal I_1 to indicate that the increment transition on increment signal IS_2 occurred before the increment transition on increment signal IS_1.

Furthermore, first level write combining queue 500 uses physical addresses and two addresses are associated only if they are equal. In Table 1, the data for each store transaction is written using hexadecimal (i.e. 2 characters per byte) however "xx" is used for data byte fields that are not used in the store transaction. Furthermore, the address values for the store transaction is written as AV_X. In addition, each store transaction in Table 1 include a non-combinable marker NCM. Store transactions that are non-combinable have a non-combinable marker set to a valid state (i.e. 1 in table 1)

TABLE 1

| TRANSACTION | ADDRESS | DATA | NCM |
|---|---|---|---|
| ST1 | AV_1 | xxxx2355xxxxxxxx | 0 |
| ST2 | AV_2 | AA554512xxxxxxxx | 0 |
| ST3 | AV_3 | xxxxxxxxA4423C15 | 0 |
| ST4 | AV_1 | xxxxxxxxF553EEDD | 0 |
| ST5 | AV_3 | xxxx5622xxxxxxxx | 1 |
| ST6 | AV_1 | ABCDEF35xxxxxxxx | 0 |

In FIG. 5A, the data value and address value from store transaction ST1 has been written into WCQ entry WCQ_E_1 of first level write combining queue 500. Specifically, address value AV_1 is written into address field ADDR_F_1 and data value 23 and 55 are written into the third and fourth data byte field of data field DATA_F_1, respectively. (thus data field DATA_F_1 is shown to contain "xxxx2355xxxxxxxx"). Because only third and fourth data byte field of data field DATA_F_1 contain valid data, WCQ valid flag WCQ_VF_1 is set to 00110000, i.e. the third and fourth WCQ valid flag bit of WCQ valid flag WCQ_VF_1 is set to the valid state (logic 1) while the other WCQ valid flag bits are set to the invalid state (logic 0). Age counter AC_1 is set to zero and non-combinable flag NCF_1 is set to the invalid state (logic 0) to indicate that WCQ entry WCQ_E_1 is a combinable WCQ entry.

In FIG. 5B, an increment transition has occurred on increment signal IS_1. Thus, age counter AC_1 of WCQ entry WCQ_E_1 has been incremented to 1. Then the data value and address value from store transaction ST2 has been written into WCQ entry WCQ_E_2 of first level write combining queue 500. Specifically, address value AV_2 is written into address field ADDR_F_2 and data value AA, 55, 45 and 12 are written into the first, second, third, and fourth data byte field of data field DATA_F_2, respectively. (thus data field DATA_F_2 is shown to contain "AA554512xxxxxxxx"). WCQ valid flag WCQ_VF_2 is set to 11110000, i.e. the first, second, third and fourth WCQ valid flag bit of WCQ valid flag WCQ_VF_2 is set to the valid state (logic 1) while the other WCQ valid flag bits are set to the invalid state (logic 0). Age counter AC_2 is set to zero and non-combinable flag NCF_2 is set to the invalid state (logic 0) to indicate that WCQ entry WCQ_E_2 is a combinable WCQ entry.

In FIG. 5C, an increment transition has occurred on increment signal IS_2 as well as on increment signal IS_1. Thus, age counter AC_1 of WCQ entry WCQ_E_1 has been incremented to 3 (once for the increment transition in increment signal IS_2 and once for the increment transition on increment signal IS_1). Age counter AC_2 is incremented to 1 due to the increment transition on increment signal IS_1. Because WCQ entry WCQ_E_1 is older than WCQ entry WCQ_E_2, age counter AC_2 ignores the increment transition on increment signal IS_2. Also the data value and address value from store transaction ST3 has been written into WCQ entry WCQ_E_3 of first level write combining queue 500. Specifically, address value AV_3 is written into address field ADDR_F_3 and data value A4, 42, 3C and 15 are written into the fifth, sixth, seventh and eighth data byte field of data field DATA_F_3, respectively. (thus data field DATA_F_3 is shown to contain "xxxxxxxxA4423C15"). WCQ valid flag WCQ_VF_3 is set to 00001111, i.e. the fifth, sixth, seventh, and eighth WCQ valid flag bit of WCQ valid flag WCQ_VF_3 is set to the valid state (logic 1) while the other WCQ valid flag bits are set to the invalid state (logic 0). Age counter AC_3 is set to zero and non-combinable flag NCF_3 is set to the invalid state (logic 0) to indicate that WCQ entry WCQ_E_3 is a combinable WCQ entry.

Figure 5D:
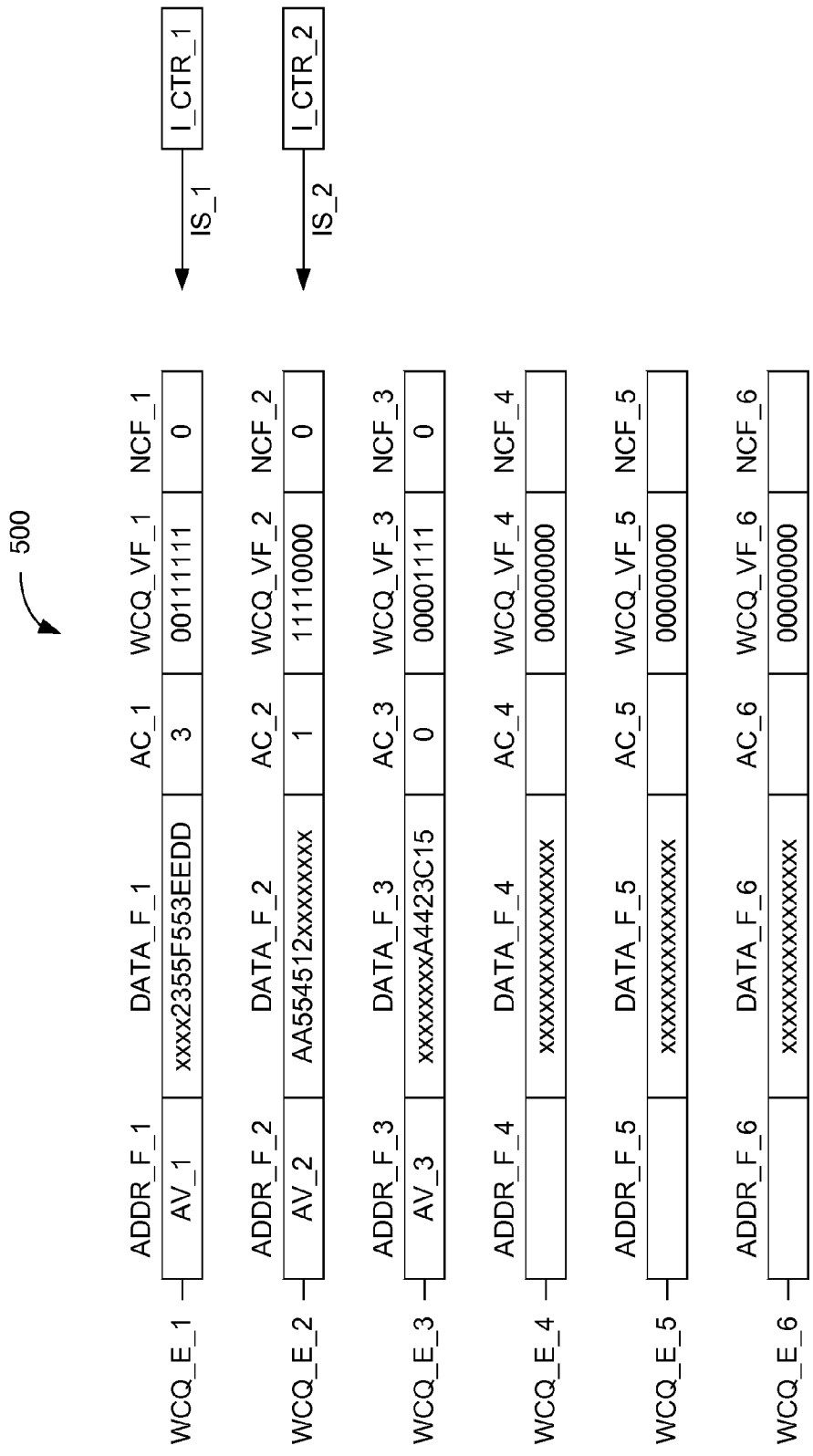

In FIG. 5D, the data value and address value from store transaction ST4 are combined into WCQ entry WCQ_E_1 because store transaction ST4 has address value AV_1 which is the same as the address field ADDR_F_1 of WCQ entry WCQ_E_1. Specifically, data value F5, 53, EE and DD are written into the fifth, sixth, seventh and eighth data byte field of data field DATA_F_1, respectively. (thus data field DATA_F_13 is shown to contain "xxxx2344F553EEDD"). WCQ valid flag WCQ_VF_1 is set to 00111111, i.e. the third, fourth, fifth, sixth, seventh, and eighth WCQ valid flag bit of WCQ valid flag WCQ_VF_1 is set to the valid state (logic 1) while the other WCQ valid flag bits are set to the invalid state (logic 0). No increment transitions occurred on increment signals IS_1 or IS_2 between FIG. 5C and FIG. 5D.

Figure 5E:
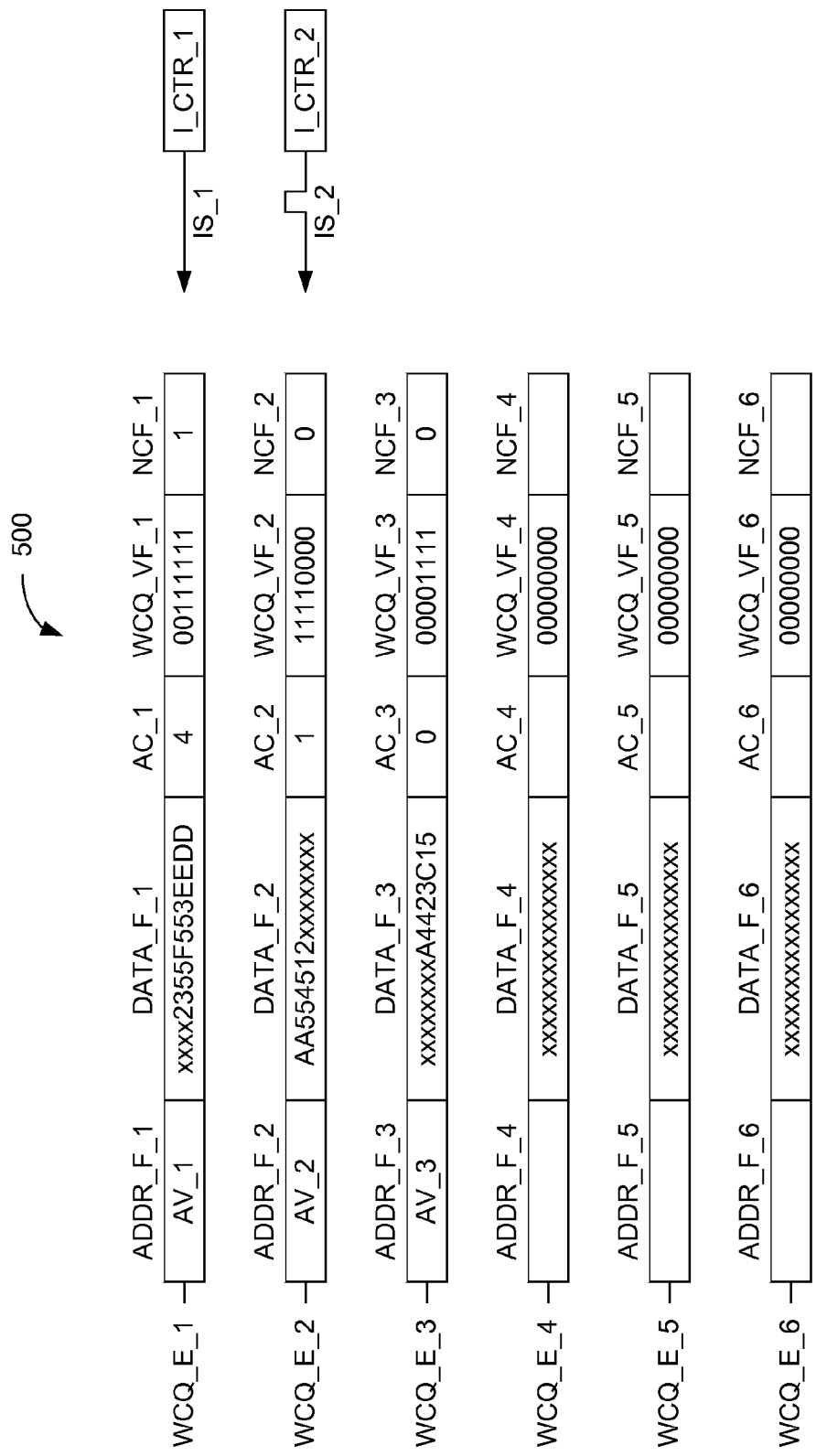

In FIG. 5E, an increment transition has occurred on increment signal IS_2. Thus, Age counter AC_1 of WCQ entry WCQ_E_1 is incremented to 4 by the increment transition on increment signal IS_2. WCQ age threshold WCQ_T_Age in the example of FIGS. 5A-5J is also equal to 4. Thus, when age counter AC_1 of WCQ entry WCQ_E_1 is incremented to 4, non-combinable flag NCF_1 of WCQ entry WCQ_E_1 is set to the valid state (as shown in FIG. 5(E). Thus, in FIG. 5E, WCQ entry WCQ_E_1 is ready to issue and should be issued as soon as possible. Because WCQ entries WCQ_E_2 and WCQ_E_3 are not the oldest WCQ entry, age counters AC_2 and AC_3 ignore the increment transition on increment signal IS_2.

Figure 5F:
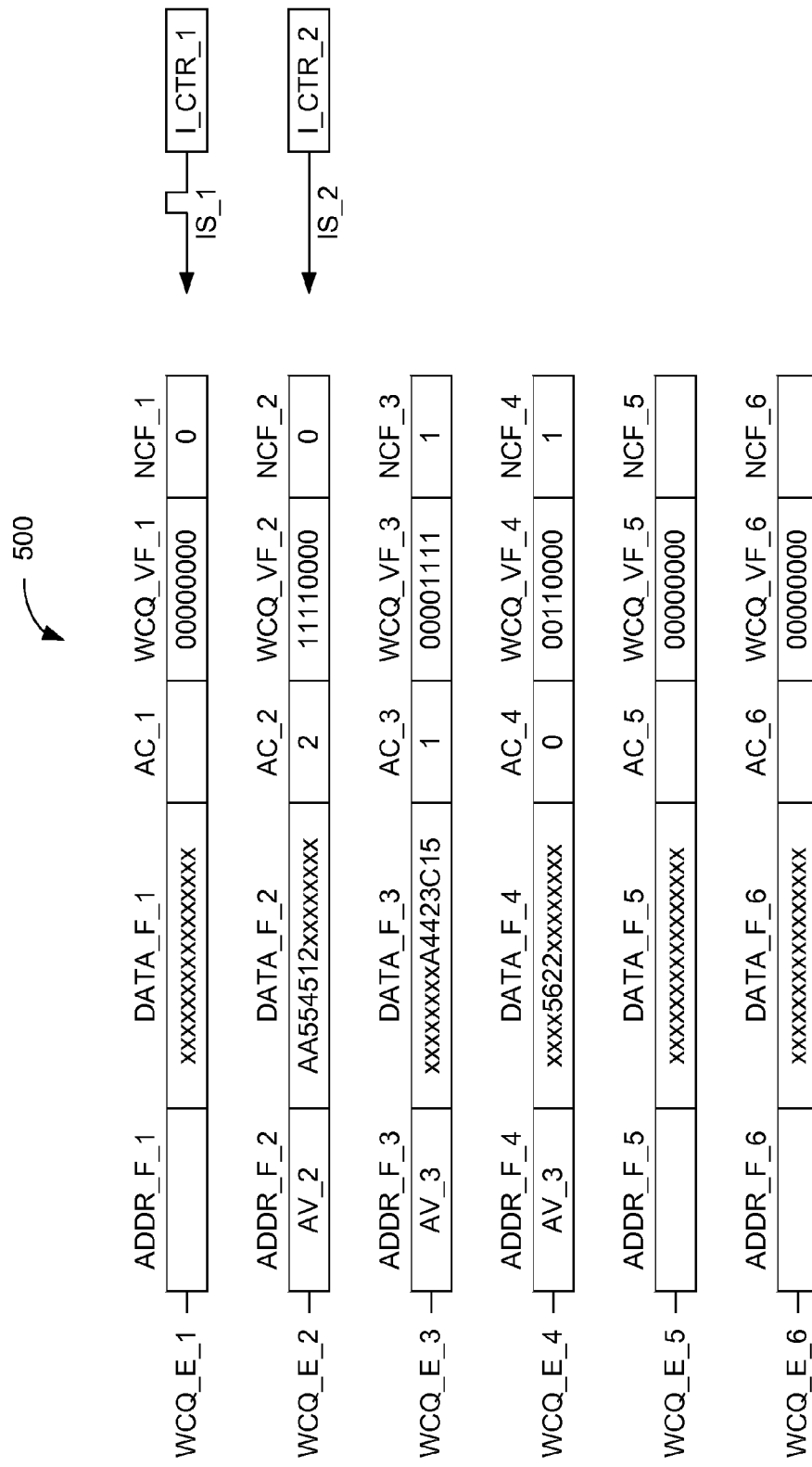

Because WCQ entry WCQ_E_1 is the oldest WCQ entry and non-combinable flag NCF_1 was set (see FIG. 5E), WCQ entry WCQ_E_1 is written out of first level write combining queue 500 as soon as possible. This is illustrated in FIG. 5F, with WCQ entry WCQ_E_1 now being available for new data with WCQ valid flag WCQ_VF_1 being set to the invalid state of 00000000. Furthermore, data field DATA_F_1 is shown to contain no valid data using with the presence of undefined data value xxxxxxxxxxxxxxxxx. Non-combinable flag NCF_1 is reset to 0, age counter AC_1 no longer holding a relevant value, and address field ADDR_F_1 also being empty.

In between FIGS. 5E and 5F, an increment transition occurred on increment signal IS_1 thus age counter AC_2 is incremented to 2 and age counter AC_3 is incremented to 1. Furthermore, store transaction ST5 is received in first level write combining queue 500. Because the non-combinable marker for store transaction ST5 is set to the valid state, the data from store transaction ST5 can not be combined with the data in WCQ entry WCQ_E_3 even though the address value for store transaction ST5 is the same as the address value in address field ADDR_F_3. Thus, the data value and address value from store transaction ST5 has been written into WCQ entry WCQ_E_4 of first level write combining queue 500. Specifically, address value AV_3 is written into address field ADDR_F_4 and data value 56, and 22 are written into the third and fourth data byte field of data field DATA_F_4, respectively. (thus data field DATA_F_4 is shown to contain "xxxx5622xxxxxxxx"). WCQ valid flag WCQ_VF_4 is set to 00110000, i.e. the third and fourth WCQ valid flag bit of WCQ valid flag WCQ_VF_4 is set to the valid state (logic 1) while the other WCQ valid flag bits are set to the invalid state (logic 0). Age counter AC_4 is set to zero and non-combinable flag NCF_4 is set to the valid state (logic 1) to indicate that WCQ entry WCQ_E_4 is now a non-combinable WCQ entry. Furthermore, because the address value AV_3 of store transaction ST5 is equal to the value stored in address field ADDR_F_3 of WCQ entry WCQ_E_3 and store transaction ST5 was non-combinable, WCQ_E_3 also becomes non-combinable. Therefore, non-combinable flag NCF_3 is set to the valid state. In other embodiments of the present invention, non-combinable store instructions do not change the non-combinable flags of other WCQ entries.

Even though WCQ entries WCQ_E_3 and WCQ_E_4 are now non-combinable WCQ entries, they are not written out of first level write combining queue 500 because WCQ entry WCQ_E_2 is oldest entry. However, in other embodiments of the present invention, non-combinable WCQ entries can be written out of the first level write combining queue before older combinable WCQ entries. Thus in those embodiments, WCQ entry WCQ_E_3 which is the oldest non-combinable WCQ entry would be written out of first level write combining queue 500.

Figure 5G:
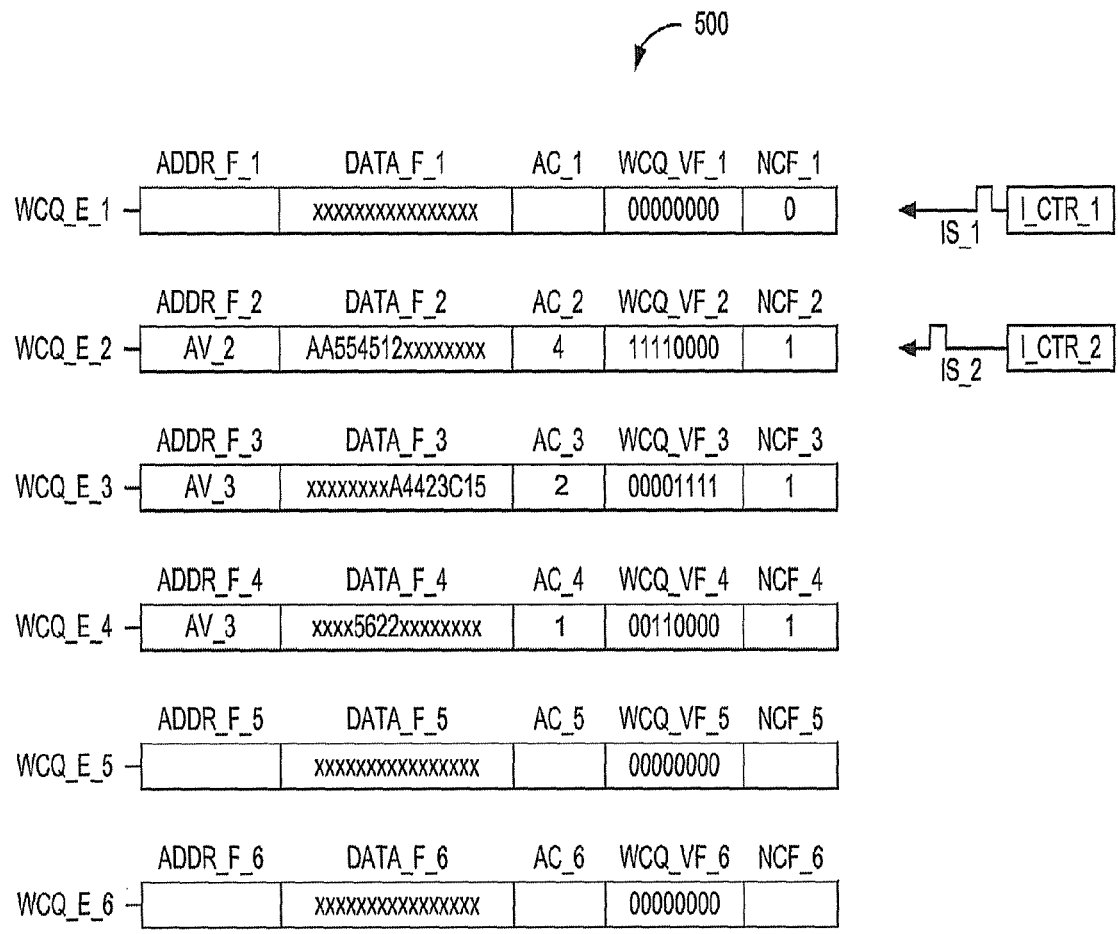

In the time between FIG. 5F and FIG. 5G an increment transition has occurred on increment signal IS 2 and increment signal IS 1. The increment transition on increment signal IS 2 causes the age counter of the oldest valid WCQ entry to increment. Thus age counter AC_2 of WCQ entry WCQ_E_2 is incremented to be equal to 3. The age counters of the other valid WCQ entries ignore the increment transition on increment signal IS_2. In addition, the increment transition on increment signal IS 1 causes the age counters of all WCQ entries to increment. Thus, age counters AG_2, AG_3, and AG_4 are incremented to 4, 2 and 1, respectively. In addition, because WCQ age threshold WCQ_T_Age in the example of FIGS. 5A-5J is also equal 4, non-combinable flag NCF_2 of WCQ entry WCQ_E_2 is set to the valid state (logic 1). Thus, WCQ entries WCQ_E_2, which is the oldest WCQ entry and has its non-combinable flag set, is ready to be issued.

Figure 5H:
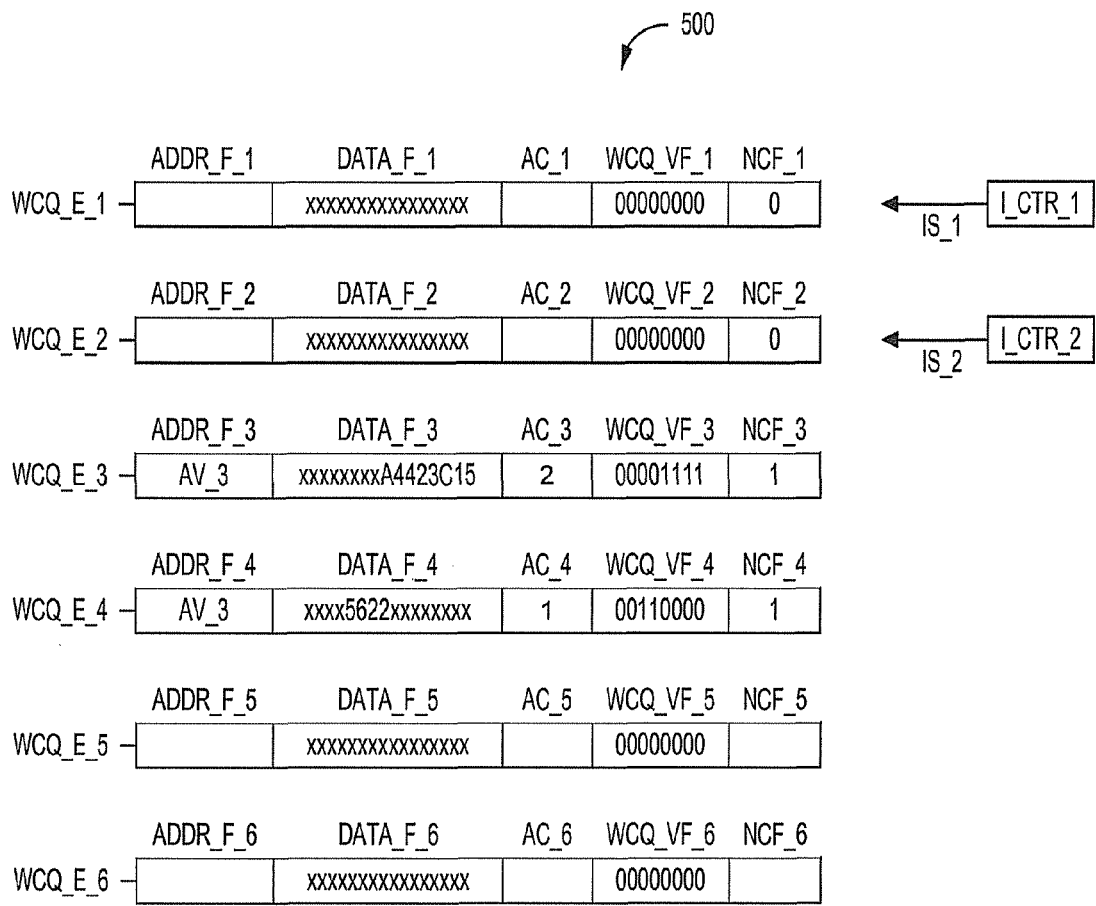

In FIG. 5H, WCQ entry WCQ_E_2 has been written out of level write combining queue 500. Thus, WCQ entry WCQ_E_2 available for new data. This is illustrated in FIG. 5H with WCQ valid flag WCQ_VF_2 being set to the invalid state of 00000000. Furthermore, data field DATA_F_2 is shown to contain no valid data using with the presence of undefined data value xxxxxxxxxxxxxxxxxx. Non-combinable flag NCF_2 is reset to 0, age counter AC_2 no longer holding a relevant value, and address field ADDR_F_2 also being empty.

No increment transitions occurred on increment signals IS 1 or IS 2 between FIG. 5G and FIG. 5H. Thus, age counters AG_3 and AG_4 are unchanged between FIG. 5G and FIG. 5H.

Figure 5I:
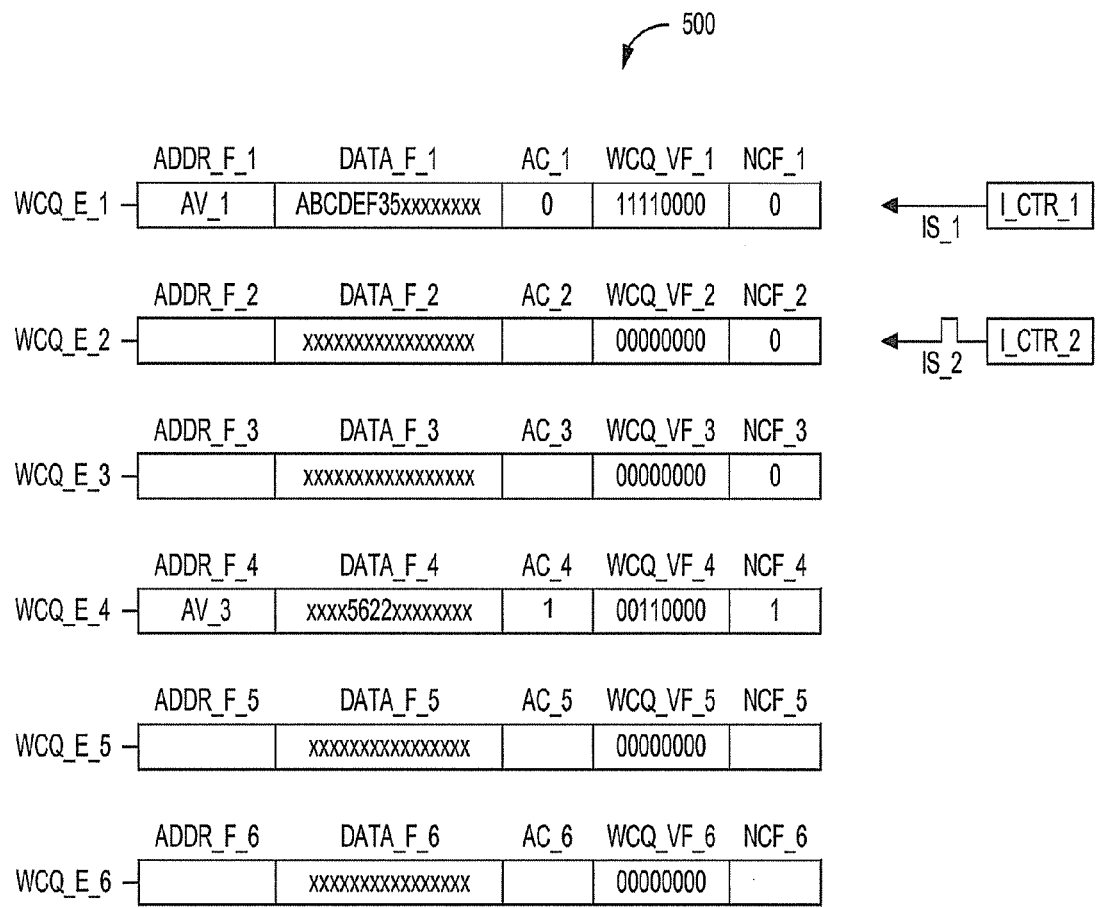

In FIG. 5I, the data value and address value from store transaction ST6 are added into WCQ entry WCQ_E_1 because store transaction ST6 has address value AV_1 which is not associated with any of the address in valid WCQ entries. Specifically, data value AB, CD, EF, and 35 are written into the first, second, third, and fourth data byte field of data field DATA_F_1, respectively. (thus data field DATA_F_13 is shown to contain JJABCDEF35xxxxxxxx"). WCQ valid flag WCQ_VF_1 is set to 11110000. Age counter AC_1 is set to zero. Furthermore WCQ entry WCQ_E_3 which was the oldest WCQ entry and in which noncombinable flag NCF_3 was in a valid state, was written out of first level write combining queue 500. This is illustrated in FIG. 5I, with WCQ entry WCQ_E_3 now being available for new data with WCQ valid flag WCQ_VF_3 being set to the invalid state of 00000000. Furthermore, data field DATA_F 3 is shown to contain no valid data using with the presence of undefined data value xxxxxxxxxxxxxxxxxx. Non-combinable flag NCF 3 is reset to 0, age counter AC_3 no longer holding a relevant value, and address field ADDR_F 3 also being empty. An increment transitions occurred on increment IS 2 prior to WCQ entry WCQ_E_3 being written out of first level write combining queue 500. Thus, age counter AG_3 would have been incremented to 3. Age counters AC_1 and AC_4 ignored the increment transition on increment signal IS_2 because at the time of the increment transition WCQ entry WCQ_E_3 was the oldest valid WCQ entry.

First level write combining queue 500 would proceed in the same manner as described above with additional store transactions. In addition WCQ entry WCQ_E_4 would be written out as soon as possible because WCQ entry WCQ_E_4 is ready to be issued because non combinable flag NCF_4 is in a valid state and WCQ entry WCQ_E_4 is the oldest valid WCQ entry.

As explained above, when WCQ entry WCQ_E_Z in first level write combining queue 320 (FIG. 3) is transferred out of first level write combining queue 320, address value AV_Z that was stored in address field ADDR_F_Z, data value DV_Z that was stored in data field DATA_F_Z, and WCQ valid flag WCQ_VF_Z are sent to either level two cache 340 or second level write merging buffer 330. Specifically, if the address value AV_Z leads to a level two cache hit address values AV_Z, data value DV_Z, and WCQ valid flag WCQ_VF_Z are sent to level two cache 340. However if the address value leads to a level two cache miss, then address value AV_Z, data value DV_Z, and WCQ valid flag WCQ_VF_Z are transferred to second level write merging buffer 330. In second level write merging buffer 330, address value AV_Z is compared to the address values already stored in second level write merging buffer 330. If address value AV_Z is associated with any of the address already stored in second level write merging buffer 330, then data value DV_Z is merged with the data store in second level write merging buffer 330. If address value AV_Z is not associated with any of the address values in second level write merging buffer 330, the data value is stored in second level write merging buffer 330.

Figure 6:
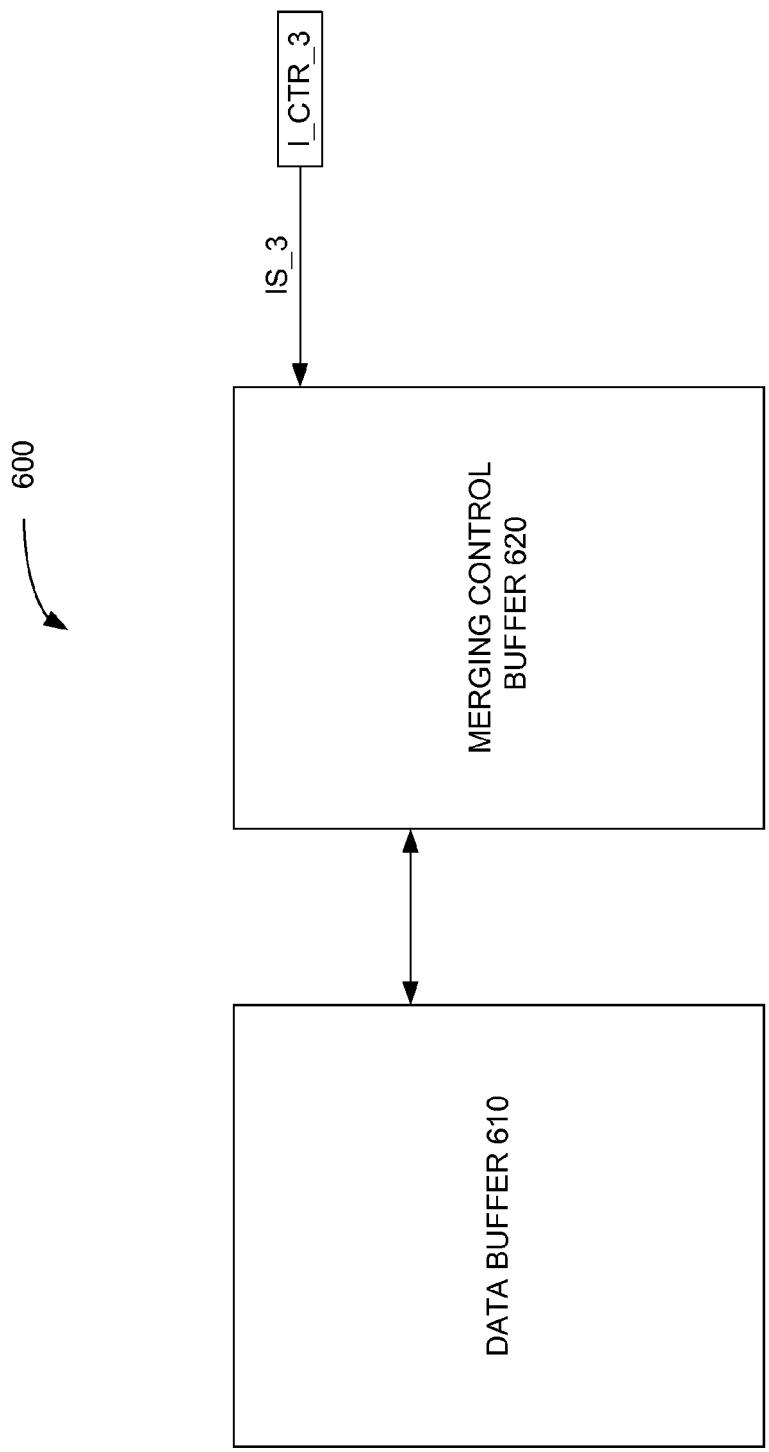
FIG. 6 is a block diagram of a second level write merging buffer in accordance with one embodiment of the present invention.

FIG. 6 is a block diagram of a second level write merging buffer 600 in accordance with one embodiment of the present invention. The embodiment of FIG. 6 includes a data buffer 610, a merging control buffer 620, and an increment counter ICTR_3, which generates an increment signal IS_3 for merging control buffer 620. Specifically, third increment counter I_CTR_3 generates an increment transition on increment signal IS_3 once every increment period INC_PER_3. Data buffer 610 includes a plurality of data buffer lines for storing the data values received from first level write combining queue 320. Each data buffer line has the same width as level two cache 340. Merging control buffer 620 includes a plurality of merging control buffer entries (hereinafter) MCB entries. When data value DV_Z is transferred from first level write combining queue 320 to second level write merging buffer 330 and the corresponding address value AV_Z is not associated with any addresses already in second level write merging buffer 330 (specifically in merging control buffer 620), data value DV_Z is stored in an unused data line of data buffer 610 say for example data line DL_Z. In addition an unused MCB entry MCB_E_Z is associated with data line DL_Z and stores address value AV_Z as well as various control parameters as explained below.

Figure 7:
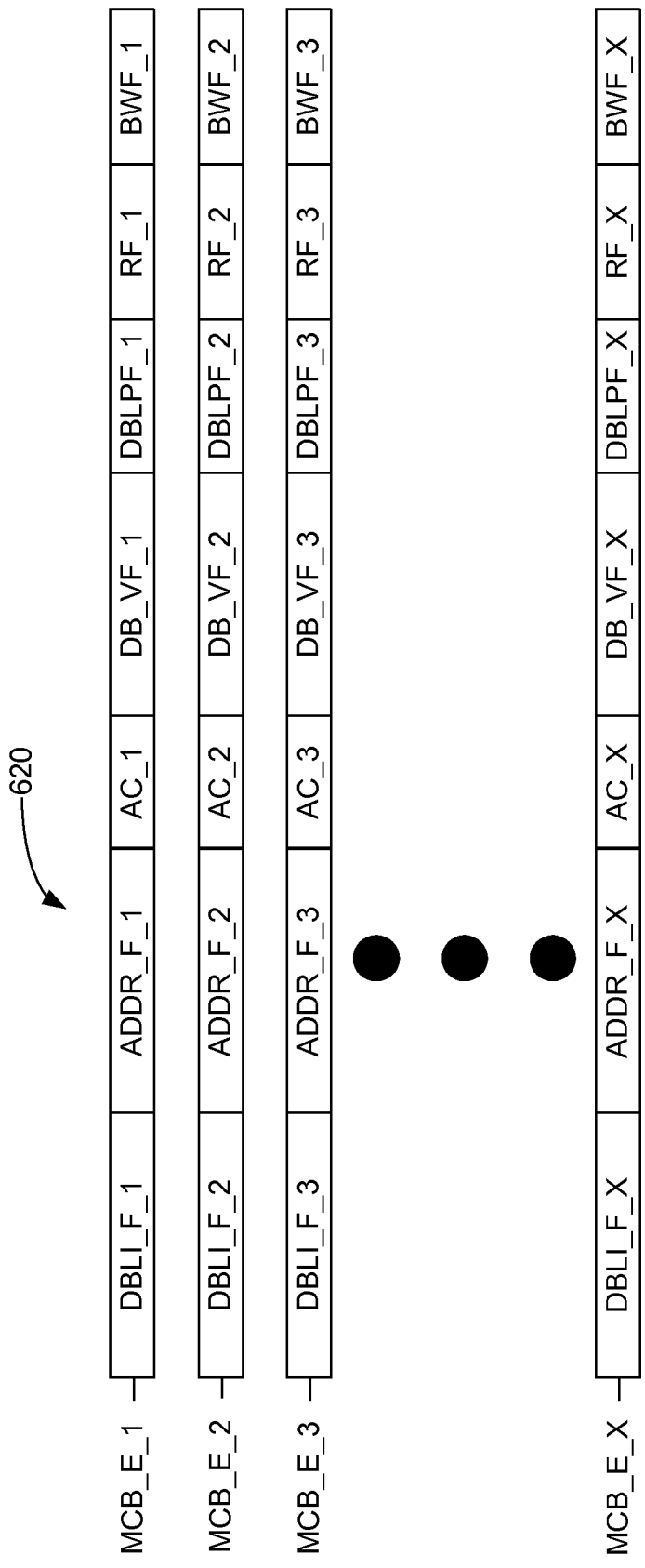
FIG. 7 is a block diagram of a merging control buffer in accordance with one embodiment of the present invention.

FIG. 7 provides details about merging control buffer 620. Specifically, merging control buffer 620 includes X MCB entries MCB_E_1, MCB_E_2, MCB_E_3, ... MCB_E_X. MCB entry MCB_E_1 includes a data buffer line identifier field DBLN_F_1, an address field ADDR_F_1, an age counter AC_1, a data buffer valid flag DB_VF_1, a data buffer line perfected flag DBLPF_1, a ready flag RF_1, and a block write flag BWF_1. Similarly, each MCB entry MCB_E_Y includes a data buffer line identifier field DBLI_F_Y, an address field ADDR_F_Y, an age counter AC_Y, a DB valid flag DB_VF_Y, a data buffer line perfected flag DBLPF_Y, a ready flag RF_Y, and a block write flag BWF_Y. Data line identifier field DBLI_F_Y stores the data line identifier value for the data line in data buffer 610 associated with MBC entry MBC_E_Y. Address field ADDR_F_Y is used to store the address value for the data that is stored in the associated data line in data buffer 610. Data buffer valid flag DB_VF_Y is used to indicates which data byte fields in the associated data line of data buffer 610 contain valid data. Specifically, when data is written into a data buffer line byte DBLB_Y_Z, the corresponding data buffer valid flag bit DB_VF_Y_Z is set to a valid state.

Age counter AC_Y is used to indicate the age of MCB entry MCB_E_Y and is used to determine when the data in the associated data buffer line is data buffer 610 is transferred out of second level write merging buffer 600 as described below. Generally, age counter AC_Y is incremented on every increment transition on increment signal IS_3 from increment counter I_CTR_3. Furthermore, in some embodiments of the present invention age counter AC_Y is also incremented whenever an unused MCB Entry is used to receive incoming data values and address values into second level write merging buffer 600. Data buffer line perfected flag indicates whether every data line data byte in the associated data buffer line contains valid data. If all data line data bytes of a data buffer line contains valid data, the data buffer line is said to be "perfected". When a data line is perfected the data buffer line perfected flag of the associated MCB entry is set to a valid state (typically logic 1). Ready flag RF_Y indicates that the data in the associated data buffer line is ready to be written out of second level write merging buffer 330. Various conditions can cause ready flag RF_Y to be set to a valid state. For example, if a data buffer line DBL_Y (associated with MCB entry MCB_E_Y) is perfected then data buffer line DBL_Y is ready to be written out of second level write merging buffer 600 thus ready flag RF_Y is set to the valid state. Another condition for setting ready flag RF_Y to the valid state would be if age counter AC_Y exceeds a MCB age threshold MCB_T_AGE. In one embodiment of the present invention both conditions are used independently to set the ready flag. Block write flag is used to indicate whether the data stored in data buffer line associated with the MCB entry came from block write transactions. If the data came from a block write transaction then the block write flag is set to a valid state (i.e. logic 1) otherwise the block write flag is set to an invalid state (i.e. logic 0). The block write flag is used in some embodiments of the present invention to help determine the destination of data of the MCB entry when leaving merging control buffer 620 (see below).

Figure 8:
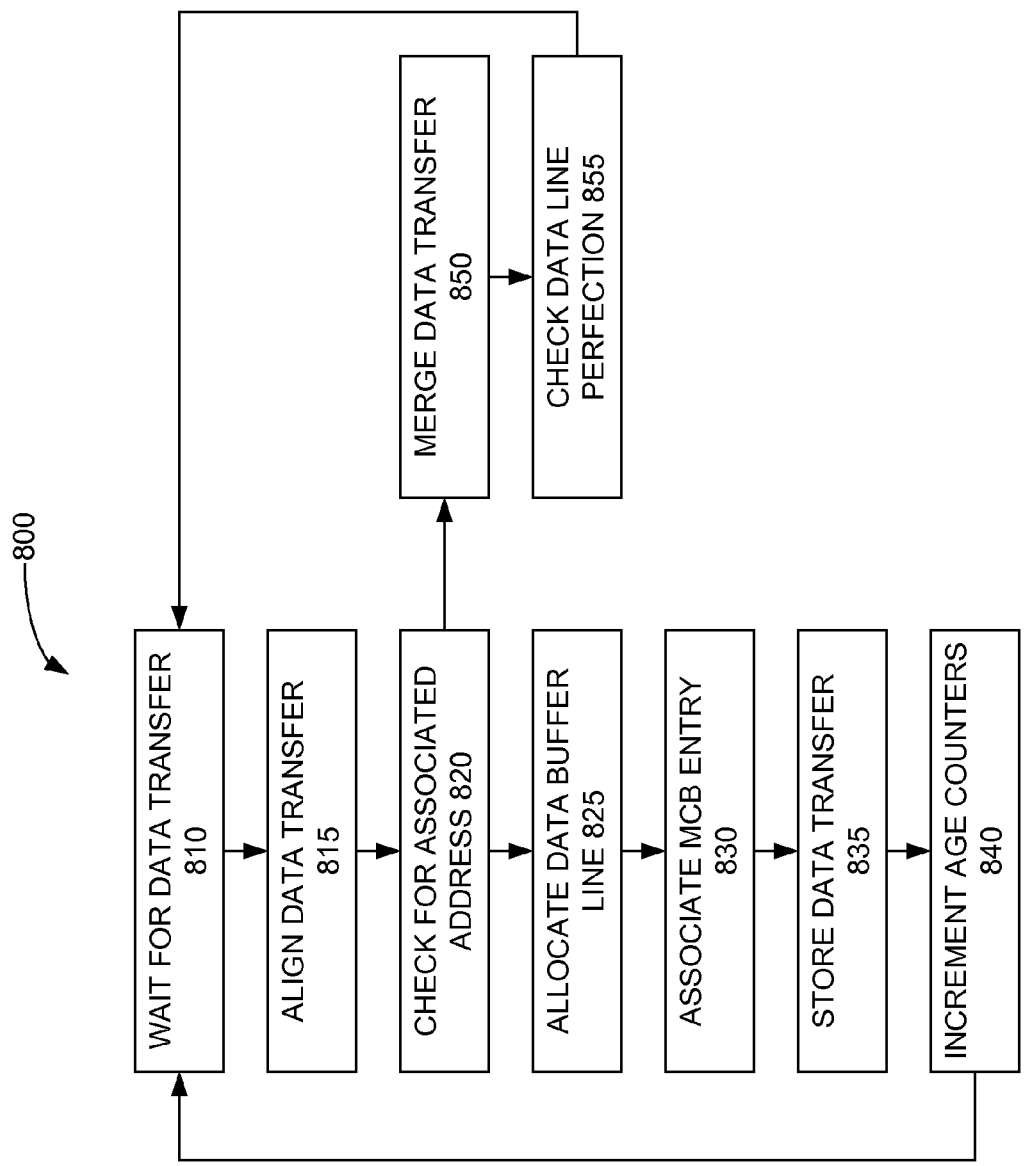
FIG. 8 is a flow diagram for a second level write merging buffer in accordance with one embodiment of the present invention.
Figure 9:
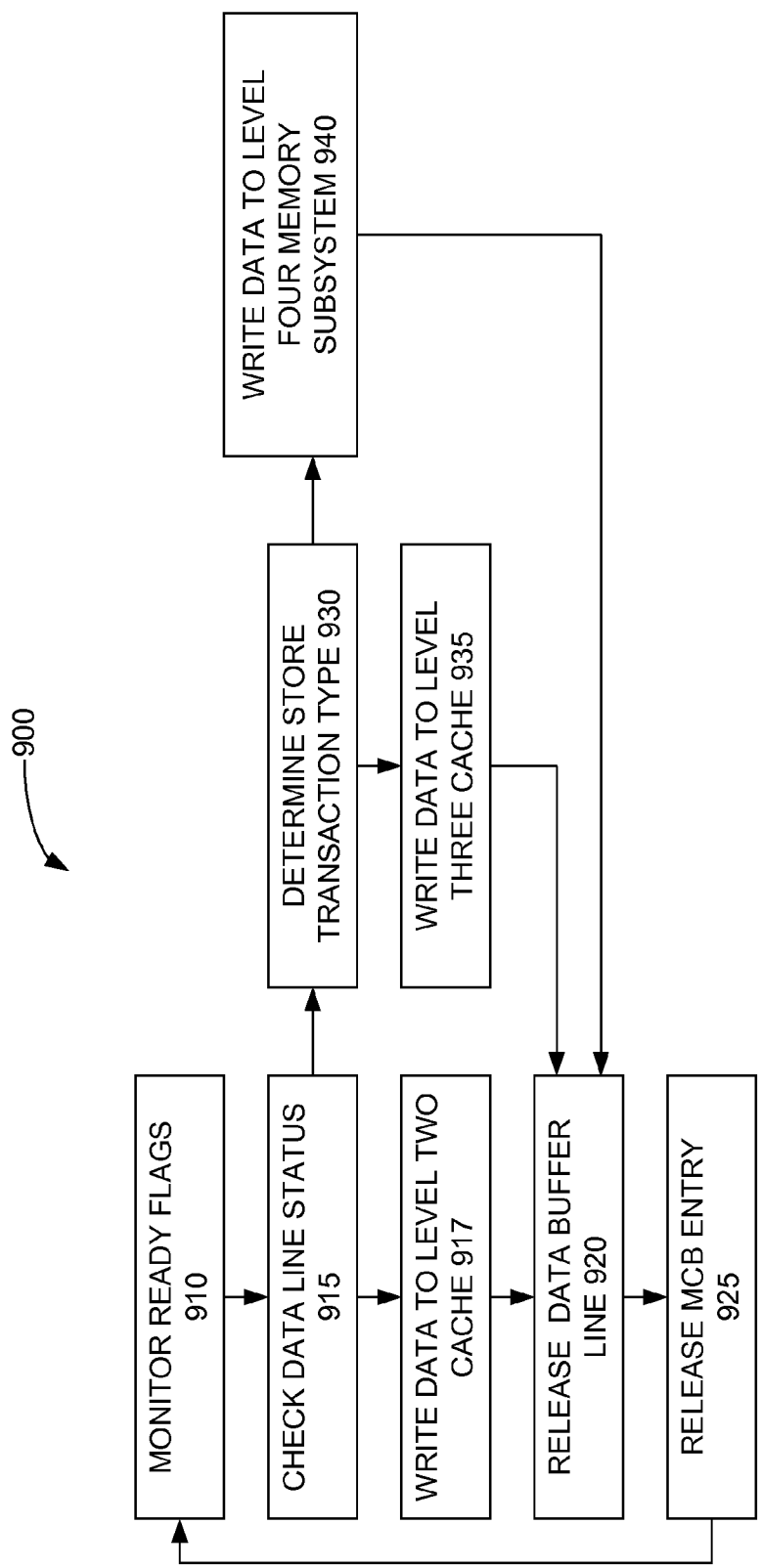
FIG. 9 is a flow diagram for a second level write merging buffer in accordance with one embodiment of the present invention.

FIG. 8 is a flow diagram 800 illustrating the operation of second level write merging buffer 600 when receiving a data transfer from a first level write combining queue. In the embodiment of FIG. 8 second level write merging buffer 600 is used for data that is not already cached in level two cache 340. Data that is cached in level two cache 340 is stored directly into level two cache 340 and does not enter second level write merging buffer 330. FIG. 9 illustrates the operation of second level write merging buffer 600 when writing data out of second level write merging buffer 600. As shown in FIG. 8, second level write merging buffer 600 waits for a data transfer in WAIT FOR DATA TRANSFER 810. When a data transfer is received, second level write merging buffer 600 aligns the data transfer in ALIGN DATA TRANSFER 815. For the description of FIG. 8, second level write merging buffer 600 receives data value DV_X, address value AV_X, and WCQ valid flag WCQ_VF_X.

Generally, the data width of the first level write combining queues are smaller than the data width of the second level write merging buffer. For example, in one embodiment of the present invention, the first level write combining queue is 16 bytes wide and the second level write merging buffer is 64 bytes wide. The 16 bytes of data from the first level write combining queue could be meant for the first 16 bytes, the second sixteen bytes, the third 16 bytes or the fourth 16 bytes of the second level write merging buffer. Thus, in ALIGN DATA TRANSFER 815, the incoming data bytes are aligned to the proper data bytes of the write second level write merging buffer. Similarly, the WCQ valid flag must be aligned with the DB valid flag in merging control buffer 620.

Then, in CHECK FOR ASSOCIATED ADDRESS 820, second level write merging buffer 600 checks to determine whether address value AV_X is associated with any of the address values already contained in second level write merging buffer 600. More specifically, the address values are stored in address fields of the MCB entries. For second level write merging buffer 600, an address value is associated with another address value if both address values would map to the same level two cache line. If address value AV_X is not associated with any of the address values in second level write merging buffer 600 then second level write merging buffer 600 allocates a data buffer line in ALLOCATE DATA BUFFER LINE 825 and associates a MCB entry to the data line by storing the data buffer line identifier for the allocated data line into the data buffer line identifier field of the allocated MCB entry. Second level write merging buffer 600, then stores the valid bytes of data value DV_X into the allocated data buffer line, stores address value AV_X into the address field of the allocated MCB entry, and storing WCQ valid flag WCQ_VF_X into the data buffer valid flag of the allocated MCB entry in STORE DATA TRANSFER 835. Because an unused data buffer line and unused MCQ entry was allocated, second level write merging buffer 600 causes the age counter in all valid MCQ entries to increment in INCREMENT AGE COUNTER 840. Then, second level write merging buffer 600 returns to WAIT FOR DATA TRANSFER 810 until the next data transfer arrives.

If in CHECK FOR ASSOCIATED ADDRESS 820, second level write merging buffer 600 found that address value AV_X is associated with an address in a MCQ entry MCQ_E_Z, then second level write merging buffer 600 merges the valid bytes of data value DV_X into the data buffer line associated with MCQ entry MCQ_E_Z and merges WCQ valid flag WCQ_VF_X into data buffer valid flag DB_VF_Z of MCQ entry MCQ_E_Z in MERGE DATA TRANSFER 850. Second level write merging buffer 600 then checks whether the data buffer line associated with MCQ entry MCQ_E_Z has been perfected (i.e. all data bytes contain valid data) in CHECK DATA LINE PERFECTION 855. If the data buffer line associated with MCQ entry MCQ_E_Z has been perfected then second level write merging buffer 600 sets ready flag RF_Z of MCQ entry MCQ_E_Z indicating that the data in the associated data buffer line of MCQ entry MCQ_M_Z is ready to leave second level write merging buffer 600. Second level write merging buffer 600 then returns to WAIT FOR DATA TRANSFER 810 until the next data transfer arrives.

FIG. 9 is a flow diagram 900 illustrating the operation of second level write merging buffer 600 when transferring data out of second level write merging buffer 600. As shown in FIG. 9, second level write merging buffer 600 monitors the ready flags of the valid MCB entries of merging control buffer 620 in MONITOR READY FLAGS 910. When second level write merging buffer 600 detects a ready flag RF_X in a valid state, second level write merging buffer 600 checks the status of the data buffer line associated with MCB entry MCB_E_X (which contains ready flag RF_X) in CHECK DATA LINE STATUS 915. Specifically, second level write merging buffer 600 determines whether the data buffer line associated with MCB entry MCB_E_X has been perfected (i.e. whether all data bytes are valid). Perfection of the associated data buffer line is indicated by data buffer line perfection flag DBLPF_X.

If the data buffer line associated with MCB entry MCB_E_X is not perfected, then second level write merging buffer 600 writes the data from the data buffer line associated with MCB entry MCB_E_X to the level two cache (See FIG. 3) in WRITE DATA TO LEVEL TWO CACHE 917. Then, second level write merging buffer 600 releases the data buffer line in RELEASE DATA BUFFER LINE 920. Similarly, second level write merging buffer 600 releases MCB entry MCB_E_X in release MCB ENTRY 925. After releasing the MCB entry and the data line, second level write merging buffer 600 returns to MONITOR READY FLAGS 910.

If in CHECK DATA LINE STATUS 915, the data buffer line associated with MCB entry MCB_E_X was perfected, second level write merging buffer 600 determines the type of store transaction that was used to perfect the data bus line in DETERMINE STORE TRANSACTION TYPE 930. If the store transactions that perfected the data buffer line associated with MCB entry MCB_E_X were multiple sub-block writes that were merged, then second level write merging buffer 600 writes the data from the data buffer line associated with MCB entry MCB_E_X to the level three cache (See FIG. 3) in WRITE DATA TO LEVEL three CACHE 935. Then, second level write merging buffer 600 releases the data buffer line in RELEASE DATA BUFFER LINE 920. Similarly, second level write merging buffer 600 releases MCB entry MCB_E_X in release MCB ENTRY 925. After releasing the MCB entry and the data line, second level write merging buffer 600 returns to MONITOR READY FLAGS 910.

If the store transactions that perfected the data buffer line associated with MCB entry MCB_E_X came from block write transactions as indicated by a valid state in block write flag BWF_X, then second level write merging buffer 600 writes the data from the data buffer line associated with MCB entry MCB_E_X to the level four memory sub-system (See FIG. 3) in WRITE DATA TO LEVEL FOUR MEMORY SUB-SYSTEM 940. Then, second level write merging buffer 600 releases the data buffer line in RELEASE DATA BUFFER LINE 920. Similarly, second level write merging buffer 600 releases MCB entry MCB_E_X in release MCB ENTRY 925. After releasing the MCB entry and the data line, second level write merging buffer 600 returns to MONITOR READY FLAGS 910.

In the various embodiments of the present invention, novel methods and systems have been described for minimizing data transfers between levels of a multi-level memory hierarchy. By using a first level write combining queue and a second level write merging buffer, the number of data transfers between various levels of caches are greatly reduced. The various embodiments of the structures and methods of this invention that are described above are illustrative only of the principles of this invention and are not intended to limit the scope of the invention to the particular embodiments described. For example, in view of this disclosure those skilled in the art can define other memory hierarchies, write combining queues, write merging buffers, caches, memory sub-systems, age counters, valid flags, non-combining flags, increment counters, and so forth, and use these alternative features to create a method, or system according to the principles of this invention. Thus, the invention is limited only by the following claims.

What is claimed is:

1. A memory system for receiving and providing data to a load store unit, the memory system comprising:
   a first level data cache coupled to the load store unit;
   a first level write combining queue for the first level data cache coupled to the first level data cache;
   a second level write merging buffer coupled to the first level write combining queue;
   a second level data cache coupled to the first level data cache, the first level write combining queue, and the second level write merging buffer; and
   a third level memory unit coupled between the second level write merging buffer and the second level data cache, the third level memory unit comprises a third level data cache and a forth level memory unit, wherein
   the memory system determines a destination for data in the second level write merging buffer based on a transaction type of a first write command and a flag entry of the second level write merging buffer that indicates whether each data byte of the second level write merging buffer comprises valid data, wherein
   the destination is the level two data cache when at least one data byte of the second level write merging buffer comprises invalid data,
   the destination is the third level data cache when each data byte of the second level write merging buffer comprises valid data and the first write command is not a block write command, and
   the destination is the forth level memory unit when each data byte of the second level write merging buffer comprises valid data and the first write command is a block write command.

2. The memory system of claim 1, wherein the first level write combining queue is configured to combine multiple store transactions from the load store unit to associated addresses.

3. The memory system of claim 2, wherein a first address is associated with a second address when the first address and the second address comprise a matching physical address.

4. The memory system of claim 2, wherein a first address is associated with a second address when the first address and the second address are within a cache line.

5. The memory system of claim 2, wherein a first address is associated with a second address when the first address and the second address are within a continuous subset of a cache line.

6. The memory system of claim 1, wherein the second level write merging buffer is configured to combine data from the first level write combining queue and to write the data combined from the first level write combining queue into the second level data cache.

7. The memory system of claim 1, wherein the second level write merging buffer is configured to combine data from the first level write combining queue and to write the data combined from the first level write combining queue into the third level memory unit.

8. The memory system of claim 1, wherein the second level write merging buffer is configured to combine data from the first level write combining queue and to write the data combined from the first level write combining queue into the fourth level memory unit.

9. The memory system of claim 1, wherein the first level write combining queue comprises a plurality of write combining queue entries, wherein each write-combining-queue entry further comprises:
   an address field; and
   a plurality of data bytes forming a data field comprising a particular data width.

10. The memory system of claim 9,
    wherein the first level write combining queue is configured to store a first address and a first set of data from a first store transaction in a first write combining queue entry; and
    wherein the first level write combining queue is configured to combine a second set of data from a second store transaction with the first set of data in the first write combining queue entry when a second address in the second write command is associated with the first address.

11. The memory system of claim 9, wherein each write combining queue entry further comprises a non-combinable flag.

12. The memory system of claim 11, wherein the first level write combining queue further comprises a first increment signal and wherein each write combining queue entry further comprises an age counter.

13. The memory system of claim 12, wherein each age counter of each valid write combining queue entry is incremented by the first increment signal.

14. The memory system of claim 13, wherein the first level write combining queue further comprises a second increment signal and wherein the age counter of an oldest valid write combining queue entry is also incremented by the second increment signal.

15. The memory system of claim 9, wherein the first level write combining queue is configured to send data from an oldest valid write combining queue entry to the second level write merging buffer and to send an address from the oldest valid write-combining queue entry to the second level write merging buffer.

16. The memory system of claim 1, wherein the second level write merging buffer comprises:
a data buffer comprising a plurality of data buffer lines; and
a merging control buffer comprising a plurality of merging control buffer entries.

17. The memory system of claim 16, the second level write merging buffer is configured to combine a set of data from the first level write combining queue.

18. The memory system of claim 16, wherein each merging control buffer entry further comprises:
a data buffer line identifier field;
an address field,
a data buffer valid flag; and
a ready flag.

19. The memory system of claim 18, wherein the second level write merging buffer is configured to store a first set of data comprising a first address from the first level write combining queue in a first data buffer line and to store the first address in an address field of a first merging control buffer entry; and
wherein the second level write merging buffer is configured to combine a second set of data comprising a second address in the first data buffer line when the second address is associated with the first address.

20. The memory system of claim 19, wherein the second address is associated with the first address, when the first address and the second address are within a cache line of the second level data cache.

21. The memory system of claim 19, wherein the second level write merging buffer is configured to store a data buffer line identifier identifying the first data buffer line stored in the data buffer identifier field of the first merging control buffer entry; and
wherein the second level write merging buffer is configured to write a valid state in the data buffer valid flag of the first merging control buffer entry when the first set of data is stored in the first data buffer line.

22. The memory system of claim 21, wherein each merging control buffer entry further comprises a data buffer line perfected flag; and
wherein the data buffer line perfected flag in the first merging control buffer entry is set to a valid state when the first data buffer line is perfected.

23. The memory system of claim 21, wherein each merging control buffer entry further comprises a block write flag; and
wherein the block write flag in the first merging control buffer entry is set to a valid state when the first set of data is generated based on a write command.

24. An apparatus, comprising:
a first level data cache coupled to the load store unit; a first level write combining queue coupled to the first level data cache; a second level write merging buffer coupled to the first level write combining queue;
a second level data cache coupled to the first level data cache, the first level write combining queue, and the second level write merging buffer; and
a third level memory unit coupled between the second level write merging buffer and the second level data cache, the third level memory unit comprises a third level data cache and a forth level memory unit, wherein
the memory system determines a destination for data in the second level write merging buffer based on a transaction type of a first write command and a flag entry of the second level write merging buffer that indicates whether each data byte of the second level write merging buffer comprises valid data, wherein
the destination is the level two data cache when at least one data byte of the second level write merging buffer comprises invalid data,
the destination is the third level data cache when each data byte of the second level write merging buffer comprises valid data and the first write command is not a block write command, and
the destination is the forth level memory unit when each data byte of the second level write merging buffer comprises valid data and the first write command is a block write command.

* * * * *